US012450201B2

(12) United States Patent
Rubenstein

(10) Patent No.: US 12,450,201 B2
(45) Date of Patent: Oct. 21, 2025

(54) SYSTEMS AND METHODS FOR ROUTING DATA TO A PARALLEL FILE SYSTEM

(71) Applicant: UMBRA Technologies Ltd., Hong Kong (CN)

(72) Inventor: Joseph E. Rubenstein, Beijing (CN)

(73) Assignee: UMBRA Technologies Ltd., British Virgin Islands (GB)

( * ) Notice: Subject to any disclaimer, the term of this patent is extended or adjusted under 35 U.S.C. 154(b) by 0 days.

(21) Appl. No.: 18/353,657

(22) Filed: Jul. 17, 2023

(65) Prior Publication Data
US 2023/0362249 A1 Nov. 9, 2023

Related U.S. Application Data

(63) Continuation of application No. 16/095,910, filed as application No. PCT/IB2017/000557 on Apr. 26, 2017, now Pat. No. 11,743,332.
(Continued)

(51) Int. Cl.
*H04L 67/06* (2022.01)
*G06F 15/173* (2006.01)
(Continued)

(52) U.S. Cl.
CPC .... *G06F 16/1858* (2019.01); *G06F 15/17331* (2013.01); *H04L 12/1881* (2013.01);
(Continued)

(58) Field of Classification Search
CPC . G06F 16/1858; H04L 67/1097; H04L 67/61; H04L 67/1008; H04L 67/1012;
(Continued)

(56) References Cited

U.S. PATENT DOCUMENTS 4,890,281 A  12/1989 Balboni et al.
5,828,847 A  10/1998 Gehr et al.
(Continued)

FOREIGN PATENT DOCUMENTS

CN  1315088  9/2001
CN  1392708  1/2003
(Continued)

OTHER PUBLICATIONS

"Operations and Quality of Service Telegraph Services, Global Virtual Network Service," ITU-T Standard, International Telecommunication Union, Geneva, Switzerland, No. F. 16, Feb. 21, 1995, pp. 1-23 (23 pages) (previously submitted in related U.S. Appl. No. 16/095,910).
(Continued)

*Primary Examiner* — Johnny B Aguiar
(74) *Attorney, Agent, or Firm* — Gardella Alciati

(57) ABSTRACT

Systems and methods for routing data from a node to a parallel file system are disclosed. In some embodiments, a network system can include nodes, parallel file systems, segments, a control server, an endpoint device, and an access point server. Each of the segments can connect two nodes. The access point server and the endpoint device can be connected with a first tunnel. The access point server and the control server can be connected with a second tunnel.

21 Claims, 22 Drawing Sheets

Related U.S. Application Data

(60) Provisional application No. 62/327,911, filed on Apr. 26, 2016, provisional application No. 62/327,846, filed on Apr. 26, 2016, provisional application No. 62/327,907, filed on Apr. 26, 2016.

(51) Int. Cl.
  *G06F 16/18*     (2019.01)
  *H04L 12/18*     (2006.01)
  *H04L 12/46*     (2006.01)
  *H04L 67/1014*   (2022.01)
  *H04L 67/1029*   (2022.01)
  *H04L 67/1095*   (2022.01)
  *H04L 67/1097*   (2022.01)
  *H04L 67/2876*   (2022.01)
  *H04L 67/568*    (2022.01)
  *H04L 67/61*     (2022.01)
  *H04W 88/14*     (2009.01)

(52) U.S. Cl.
  CPC .......... *H04L 12/4633* (2013.01); *H04L 67/06* (2013.01); *H04L 67/1014* (2013.01); *H04L 67/1029* (2013.01); *H04L 67/1095* (2013.01); *H04L 67/1097* (2013.01); *H04L 67/2876* (2013.01); *H04L 67/568* (2022.05); *H04L 67/61* (2022.05); *H04W 88/14* (2013.01)

(58) Field of Classification Search
  CPC ... H04L 67/1029; H04L 67/1001; H04L 9/40; H04L 67/01
  See application file for complete search history.

(56) References Cited

U.S. PATENT DOCUMENTS

| | | | |
|---|---|---|---|
| 5,893,089 | A | 4/1999 | Kikinis |
| 5,940,838 | A | 8/1999 | Schmuck et al. |
| 6,209,039 | B1 | 3/2001 | Albright et al. |
| 6,289,201 | B1 | 9/2001 | Weber et al. |
| 6,374,302 | B1 | 4/2002 | Glasso et al. |
| 6,463,465 | B1* | 10/2002 | Nieuwejaar ......... H04L 67/1001 709/212 |
| 6,477,166 | B1 | 11/2002 | Sanzi et al. |
| 6,593,863 | B2 | 7/2003 | Pitio |
| 6,611,587 | B2 | 8/2003 | Brown et al. |
| 6,671,361 | B2 | 12/2003 | Goldstein |
| 6,678,241 | B1 | 1/2004 | Gai et al. |
| 6,690,223 | B1 | 2/2004 | Wan |
| 6,693,876 | B1 | 2/2004 | Zey |
| 6,735,207 | B1 | 5/2004 | Prasad et al. |
| 6,785,295 | B1 | 8/2004 | Graf et al. |
| 6,879,995 | B1 | 4/2005 | Chinta et al. |
| 6,973,048 | B2 | 12/2005 | Pitio |
| 6,996,117 | B2 | 2/2006 | Lee et al. |
| 7,006,505 | B1 | 2/2006 | Bleszynski et al. |
| 7,039,701 | B2 | 5/2006 | Wesley |
| 7,069,318 | B2 | 6/2006 | Burbeck et al. |
| 7,145,882 | B2 | 12/2006 | Limaye et al. |
| 7,145,922 | B2 | 12/2006 | Pitio |
| 7,161,899 | B2 | 1/2007 | Limaye et al. |
| 7,161,965 | B2 | 1/2007 | Pitio |
| 7,173,902 | B2 | 2/2007 | Daniell et al. |
| 7,177,929 | B2 | 2/2007 | Burbeck et al. |
| 7,221,687 | B2 | 5/2007 | Shugard |
| 7,224,706 | B2 | 5/2007 | Loeffler-Lejeune |
| 7,254,833 | B1 | 8/2007 | Cornelius et al. |
| 7,269,130 | B2 | 9/2007 | Pitio |
| 7,310,348 | B2 | 12/2007 | Trinh et al. |
| 7,349,403 | B2 | 3/2008 | Lee et al. |
| 7,349,411 | B2 | 3/2008 | Pitio |
| 7,349,435 | B2 | 3/2008 | Giacomini |
| 7,389,312 | B2 | 6/2008 | Ohran |
| 7,433,964 | B2 | 10/2008 | Raguram et al. |
| 7,551,623 | B1 | 6/2009 | Feroz et al. |
| 7,577,691 | B2 | 8/2009 | Novik et al. |
| 7,587,487 | B1 | 9/2009 | Gunturu |
| 7,633,909 | B1 | 12/2009 | Jones et al. |
| 7,689,722 | B1 | 3/2010 | Timms et al. |
| 7,711,793 | B1* | 5/2010 | Wilson ................ G06F 11/2089 711/100 |
| 7,742,405 | B2 | 6/2010 | Trinh et al. |
| 7,742,411 | B2 | 6/2010 | Trinh et al. |
| 7,801,030 | B1 | 9/2010 | Aggarwal et al. |
| 7,822,877 | B2 | 10/2010 | Chong et al. |
| 7,870,418 | B2 | 1/2011 | Sekaran et al. |
| 7,886,305 | B2 | 2/2011 | Ahmed et al. |
| 7,930,339 | B2 | 4/2011 | Tobita et al. |
| 7,957,311 | B2 | 6/2011 | Trinh et al. |
| 8,010,751 | B2 | 8/2011 | Yang et al. |
| 8,064,909 | B2 | 11/2011 | Spinelli et al. |
| 8,069,258 | B1 | 11/2011 | Howell |
| 8,069,435 | B1 | 11/2011 | Lai |
| 8,073,777 | B2 | 12/2011 | Barry et al. |
| 8,107,363 | B1 | 1/2012 | Saluja |
| 8,239,915 | B1 | 8/2012 | Satish et al. |
| 8,259,571 | B1 | 9/2012 | Raphel et al. |
| 8,266,672 | B2 | 9/2012 | Moore |
| 8,401,028 | B2 | 3/2013 | Mihaly et al. |
| 8,422,397 | B2 | 4/2013 | Ansari et al. |
| 8,437,641 | B2 | 5/2013 | Lee et al. |
| 8,458,786 | B1 | 6/2013 | Kailash et al. |
| 8,544,065 | B2 | 9/2013 | Archer et al. |
| 8,611,335 | B1 | 12/2013 | Wu et al. |
| 8,611,355 | B1 | 12/2013 | Sella et al. |
| 8,625,411 | B2 | 1/2014 | Srivivasan et al. |
| 8,687,791 | B1 | 4/2014 | Cordell et al. |
| 8,699,683 | B1 | 4/2014 | Jackson et al. |
| 8,769,057 | B1 | 7/2014 | Breau et al. |
| 8,798,060 | B1 | 8/2014 | Vautrin et al. |
| 8,854,965 | B1 | 10/2014 | Richards |
| 8,861,344 | B2 | 10/2014 | Trinh et al. |
| 8,874,680 | B1 | 10/2014 | Das |
| 8,966,075 | B1 | 2/2015 | Chickering et al. |
| 8,976,798 | B2 | 3/2015 | Border et al. |
| 9,015,310 | B2 | 4/2015 | Ochi |
| 9,038,151 | B1 | 5/2015 | Chua et al. |
| 9,110,820 | B1 | 8/2015 | Bent et al. |
| 9,164,702 | B1 | 10/2015 | Nesbit et al. |
| 9,164,795 | B1 | 10/2015 | Vincent |
| 9,167,501 | B2 | 10/2015 | Kempf et al. |
| 9,172,603 | B2 | 10/2015 | Padmanabhan et al. |
| 9,213,594 | B2 | 12/2015 | Strasser et al. |
| 9,241,004 | B1 | 1/2016 | April |
| 9,253,028 | B2 | 2/2016 | DeCusatis et al. |
| 9,277,452 | B1 | 3/2016 | Aithal et al. |
| 9,294,304 | B2 | 3/2016 | Sindhu |
| 9,294,497 | B1 | 3/2016 | Ben-Or et al. |
| 9,298,719 | B2 | 3/2016 | Noronha et al. |
| 9,350,644 | B2 | 5/2016 | Desai et al. |
| 9,350,710 | B2 | 5/2016 | Herle et al. |
| 9,351,193 | B2 | 5/2016 | Raleigh et al. |
| 9,369,433 | B1 | 6/2016 | Paul et al. |
| 9,432,258 | B2 | 8/2016 | Van der Merwe et al. |
| 9,432,336 | B2 | 8/2016 | Ostrowski |
| 9,450,817 | B1 | 9/2016 | Bahadur et al. |
| 9,455,924 | B2 | 9/2016 | Cicic et al. |
| 9,461,996 | B2 | 10/2016 | Hayton et al. |
| 9,525,663 | B2 | 12/2016 | Yuan et al. |
| 9,525,696 | B2 | 12/2016 | Kapoor et al. |
| 9,544,137 | B1 | 1/2017 | Brandwine |
| 9,554,061 | B1 | 1/2017 | Proctor et al. |
| 9,565,117 | B2 | 2/2017 | Dahod et al. |
| 9,569,587 | B2 | 2/2017 | Ansari et al. |
| 9,590,820 | B1 | 3/2017 | Shukla |
| 9,590,902 | B2 | 3/2017 | Lin et al. |
| 9,609,003 | B1 | 3/2017 | Chmielewski et al. |
| 9,609,482 | B1 | 3/2017 | Want et al. |
| 9,641,612 | B2 | 5/2017 | Yu |
| 9,699,001 | B2 | 7/2017 | Addanki et al. |
| 9,699,135 | B2 | 7/2017 | Dinha |
| 9,729,539 | B1 | 8/2017 | Agrawal et al. |
| 9,858,559 | B2 | 1/2018 | Raleigh et al. |

(56) References Cited

U.S. PATENT DOCUMENTS

| | | |
|---|---|---|
| 9,888,042 B2 | 2/2018 | Annamalaisami et al. |
| 9,898,317 B2 | 2/2018 | Nakil et al. |
| 9,948,649 B1 | 4/2018 | Zhao et al. |
| 10,044,678 B2 | 8/2018 | Van der Merwe et al. |
| 10,061,664 B2 | 8/2018 | Verkaik et al. |
| 10,070,369 B2 | 9/2018 | Lynn, Jr. et al. |
| 10,078,754 B1 | 9/2018 | Brandwine et al. |
| 10,079,839 B1 | 9/2018 | Bryan et al. |
| 10,091,304 B2 | 10/2018 | Hoffmann |
| 10,237,253 B2 | 3/2019 | Chen |
| 10,275,267 B1 | 4/2019 | De Kadt et al. |
| 10,331,472 B2 | 6/2019 | Wang |
| 10,574,482 B2 | 2/2020 | Ore et al. |
| 10,673,712 B1 | 6/2020 | Gosar et al. |
| 10,756,929 B2 | 8/2020 | Knutsen et al. |
| 10,904,201 B1 | 1/2021 | Ermagan et al. |
| 10,922,286 B2 | 2/2021 | Rubenstein |
| 11,032,187 B2 | 6/2021 | Hassan |
| 11,092,447 B2 | 8/2021 | Aiello et al. |
| 11,108,595 B2 | 8/2021 | Rubenstein |
| 11,743,332 B2 | 8/2023 | Rubenstein |
| 2002/0007350 A1 | 1/2002 | Yen |
| 2002/0029267 A1 | 3/2002 | Sankuratripati et al. |
| 2002/0046253 A1 | 4/2002 | Uchida et al. |
| 2002/0049901 A1 | 4/2002 | Carvey |
| 2002/0087447 A1 | 7/2002 | McDonald et al. |
| 2002/0186654 A1 | 12/2002 | Tornar |
| 2003/0023351 A1 | 1/2003 | Fukui |
| 2003/0046529 A1 | 3/2003 | Loison et al. |
| 2003/0072433 A1 | 4/2003 | Brown et al. |
| 2003/0110214 A1 | 6/2003 | Sato |
| 2003/0147403 A1 | 8/2003 | Border et al. |
| 2003/0195973 A1 | 10/2003 | Savarda |
| 2003/0233551 A1 | 12/2003 | Kouznetsov et al. |
| 2004/0205339 A1 | 10/2004 | Medin |
| 2004/0268151 A1 | 12/2004 | Matsuda |
| 2005/0180319 A1 | 8/2005 | Hutnik et al. |
| 2005/0203892 A1 | 9/2005 | Wesley et al. |
| 2005/0208926 A1 | 9/2005 | Hamada |
| 2005/0235352 A1 | 10/2005 | Staats et al. |
| 2006/0020793 A1 | 1/2006 | Rogers et al. |
| 2006/0031407 A1 | 2/2006 | Dispensa et al. |
| 2006/0031483 A1 | 2/2006 | Lund et al. |
| 2006/0047944 A1 | 3/2006 | Kilian-Kehr |
| 2006/0075057 A1 | 4/2006 | Gildea et al. |
| 2006/0179150 A1 | 8/2006 | Farley et al. |
| 2006/0195896 A1 | 8/2006 | Fulp et al. |
| 2006/0225072 A1 | 10/2006 | Lari et al. |
| 2007/0083482 A1* | 4/2007 | Rathi .................. G06F 16/185 |
| 2007/0112812 A1 | 5/2007 | Harvey et al. |
| 2007/0165672 A1 | 7/2007 | Keels et al. |
| 2007/0168486 A1 | 7/2007 | McCoy et al. |
| 2007/0168517 A1 | 7/2007 | Weller et al. |
| 2007/0226043 A1 | 9/2007 | Pietsch et al. |
| 2008/0010676 A1 | 1/2008 | Dosa Racz et al. |
| 2008/0043742 A1 | 2/2008 | Pong et al. |
| 2008/0091598 A1 | 4/2008 | Fauleau |
| 2008/0117927 A1 | 5/2008 | Donhauser et al. |
| 2008/0130891 A1 | 6/2008 | Sun et al. |
| 2008/0168377 A1 | 7/2008 | Stallings et al. |
| 2008/0191598 A1 | 8/2008 | Yang et al. |
| 2008/0240121 A1 | 10/2008 | Xiong et al. |
| 2008/0247386 A1 | 10/2008 | Wildfeuer |
| 2008/0256166 A1 | 10/2008 | Branson et al. |
| 2008/0260151 A1 | 10/2008 | Fluhrer et al. |
| 2008/0301794 A1 | 12/2008 | Lee |
| 2009/0003223 A1 | 1/2009 | McCallum et al. |
| 2009/0100165 A1 | 4/2009 | Wesley, Sr. et al. |
| 2009/0106569 A1 | 4/2009 | Roh et al. |
| 2009/0122990 A1 | 5/2009 | Gundavelli et al. |
| 2009/0129386 A1 | 5/2009 | Rune |
| 2009/0132621 A1* | 5/2009 | Jensen .................. G06F 3/0643 |
| 2009/0141734 A1 | 6/2009 | Brown et al. |
| 2009/0144416 A1 | 6/2009 | Chatley et al. |
| 2009/0144443 A1 | 6/2009 | Vasseur et al. |
| 2009/0193428 A1 | 7/2009 | Dalberg et al. |
| 2009/0213754 A1 | 8/2009 | Melamed |
| 2009/0217109 A1 | 8/2009 | Sekaran et al. |
| 2009/0228669 A1* | 9/2009 | Slesarev ............... G06F 3/0649 |
| | | 711/161 |
| 2009/0259798 A1* | 10/2009 | Wang .................. G06F 3/0643 |
| | | 711/E12.008 |
| 2010/0017603 A1 | 1/2010 | Jones |
| 2010/0131616 A1 | 5/2010 | Walter et al. |
| 2010/0250700 A1 | 9/2010 | O'Brien et al. |
| 2010/0316052 A1 | 12/2010 | Petersen |
| 2010/0325309 A1 | 12/2010 | Cicic et al. |
| 2011/0007652 A1 | 1/2011 | Bai |
| 2011/0185006 A1 | 7/2011 | Raghav et al. |
| 2011/0231917 A1 | 9/2011 | Chaturvedi et al. |
| 2011/0247063 A1 | 10/2011 | Aabye et al. |
| 2011/0268435 A1 | 11/2011 | Mizutani et al. |
| 2011/0314071 A1* | 12/2011 | Johnson .................. G06F 16/13 |
| | | 707/827 |
| 2011/0314473 A1 | 12/2011 | Yang et al. |
| 2012/0005264 A1 | 1/2012 | McWhirter et al. |
| 2012/0005307 A1* | 1/2012 | Das ..................... G06F 16/1727 |
| | | 709/219 |
| 2012/0082057 A1 | 4/2012 | Welin et al. |
| 2012/0105637 A1 | 5/2012 | Yousefi et al. |
| 2012/0158882 A1 | 6/2012 | Oehme et al. |
| 2012/0179904 A1 | 7/2012 | Dunn et al. |
| 2012/0185559 A1 | 7/2012 | Wesley, Sr. et al. |
| 2012/0188867 A1 | 7/2012 | Fiorone et al. |
| 2012/0196646 A1 | 8/2012 | Crinon et al. |
| 2012/0210417 A1 | 8/2012 | Shieh |
| 2012/0210434 A1 | 8/2012 | Curtis et al. |
| 2012/0270580 A1 | 10/2012 | Anisimov et al. |
| 2012/0320916 A1 | 12/2012 | Sebastian |
| 2013/0070751 A1 | 3/2013 | Atwal et al. |
| 2013/0110787 A1 | 5/2013 | Garimella et al. |
| 2013/0173900 A1 | 7/2013 | Liu |
| 2013/0247167 A1 | 9/2013 | Paul et al. |
| 2013/0259465 A1 | 10/2013 | Blair |
| 2013/0283118 A1 | 10/2013 | Rayner |
| 2013/0286835 A1 | 10/2013 | Plamondon et al. |
| 2013/0287037 A1 | 10/2013 | Bush et al. |
| 2013/0308471 A1 | 11/2013 | Krzanowski et al. |
| 2013/0318233 A1 | 11/2013 | Biswas et al. |
| 2013/0322255 A1 | 12/2013 | Dillon |
| 2013/0343180 A1 | 12/2013 | Kini et al. |
| 2014/0020942 A1 | 1/2014 | Cho et al. |
| 2014/0026179 A1 | 1/2014 | Deverajan et al. |
| 2014/0071835 A1 | 3/2014 | Sun et al. |
| 2014/0086253 A1 | 3/2014 | Yong |
| 2014/0101036 A1 | 4/2014 | Phillips et al. |
| 2014/0108665 A1 | 4/2014 | Arora et al. |
| 2014/0149549 A1 | 5/2014 | Fu |
| 2014/0149552 A1 | 5/2014 | Carney et al. |
| 2014/0169214 A1 | 6/2014 | Nakajima |
| 2014/0181248 A1 | 6/2014 | Deutsch et al. |
| 2014/0199962 A1 | 7/2014 | Mohammed et al. |
| 2014/0210693 A1 | 7/2014 | Bhamidipati et al. |
| 2014/0215059 A1 | 7/2014 | Astiz Lezaun et al. |
| 2014/0226456 A1 | 8/2014 | Khan et al. |
| 2014/0229945 A1 | 8/2014 | Barkai et al. |
| 2014/0237464 A1 | 8/2014 | Waterman et al. |
| 2014/0250066 A1 | 9/2014 | Calkowski et al. |
| 2014/0269712 A1 | 9/2014 | Kidambi |
| 2014/0269728 A1 | 9/2014 | Jalan et al. |
| 2014/0278543 A1 | 9/2014 | Kasdon |
| 2014/0280911 A1 | 9/2014 | Wood et al. |
| 2014/0289826 A1 | 9/2014 | Croome |
| 2014/0304728 A1 | 10/2014 | Wendling |
| 2014/0310243 A1 | 10/2014 | McGee et al. |
| 2014/0324931 A1 | 10/2014 | Grube et al. |
| 2014/0331309 A1 | 11/2014 | Spiers et al. |
| 2014/0337459 A1 | 11/2014 | Kuang et al. |
| 2014/0341023 A1 | 11/2014 | Kim et al. |
| 2014/0351939 A1 | 11/2014 | Moore et al. |
| 2014/0359704 A1 | 12/2014 | Chen |
| 2014/0362712 A1 | 12/2014 | Agrawal et al. |
| 2014/0366119 A1 | 12/2014 | Floyd et al. |
| 2014/0369230 A1 | 12/2014 | Nallur |

(56) References Cited

U.S. PATENT DOCUMENTS

| | | | |
|---|---|---|---|
| 2015/0006596 A1* | 1/2015 | Fukui | G06F 16/178 |
| | | | 707/831 |
| 2015/0056960 A1 | 2/2015 | Egner et al. | |
| 2015/0063117 A1 | 3/2015 | DiBurro et al. | |
| 2015/0063360 A1 | 3/2015 | Thakkar et al. | |
| 2015/0086018 A1 | 3/2015 | Harjula et al. | |
| 2015/0089582 A1 | 3/2015 | Dilley et al. | |
| 2015/0095384 A1 | 4/2015 | Antony et al. | |
| 2015/0121532 A1 | 4/2015 | Barel | |
| 2015/0128246 A1 | 5/2015 | Feghali et al. | |
| 2015/0207812 A1 | 7/2015 | Back et al. | |
| 2015/0222633 A1 | 8/2015 | Smith et al. | |
| 2015/0222637 A1 | 8/2015 | Hung et al. | |
| 2015/0248434 A1 | 9/2015 | Avati et al. | |
| 2015/0271104 A1 | 9/2015 | Chikkamath et al. | |
| 2015/0281176 A1 | 10/2015 | Banfield | |
| 2015/0326588 A1 | 11/2015 | Vissamsetty et al. | |
| 2015/0341223 A1 | 11/2015 | Shen et al. | |
| 2015/0363230 A1 | 12/2015 | Kasahara et al. | |
| 2016/0006695 A1 | 1/2016 | Prodoehl et al. | |
| 2016/0028586 A1 | 1/2016 | Blair | |
| 2016/0028770 A1 | 1/2016 | Raleigh et al. | |
| 2016/0048938 A1 | 2/2016 | Jones et al. | |
| 2016/0055323 A1 | 2/2016 | Stuntebeck et al. | |
| 2016/0077745 A1 | 3/2016 | Patel et al. | |
| 2016/0105530 A1 | 4/2016 | Shribman et al. | |
| 2016/0117277 A1 | 4/2016 | Raindel et al. | |
| 2016/0119279 A1 | 4/2016 | Maslak et al. | |
| 2016/0127492 A1 | 5/2016 | Malwankar et al. | |
| 2016/0134528 A1 | 5/2016 | Lin et al. | |
| 2016/0134543 A1 | 5/2016 | Zhang et al. | |
| 2016/0140140 A1* | 5/2016 | Darcy | H04L 67/1097 |
| | | | 707/827 |
| 2016/0165463 A1 | 6/2016 | Zhang | |
| 2016/0224460 A1 | 8/2016 | Bryant et al. | |
| 2016/0226755 A1 | 8/2016 | Hammam et al. | |
| 2016/0255556 A1 | 9/2016 | Michel et al. | |
| 2016/0261575 A1 | 9/2016 | Maldaner | |
| 2016/0285977 A1 | 9/2016 | Ng et al. | |
| 2016/0308762 A1 | 10/2016 | Teng et al. | |
| 2016/0330736 A1 | 11/2016 | Polehn et al. | |
| 2016/0337223 A1 | 11/2016 | Mackay | |
| 2016/0337484 A1 | 11/2016 | Tola | |
| 2016/0352628 A1 | 12/2016 | Reddy et al. | |
| 2016/0364158 A1 | 12/2016 | Narayanan et al. | |
| 2016/0366233 A1 | 12/2016 | Le et al. | |
| 2017/0063920 A1 | 3/2017 | Thomas et al. | |
| 2017/0078922 A1 | 3/2017 | Raleigh et al. | |
| 2017/0105142 A1 | 4/2017 | Hecht et al. | |
| 2017/0201556 A1 | 7/2017 | Fox et al. | |
| 2017/0208052 A1* | 7/2017 | Jai | H04L 63/08 |
| 2017/0230821 A1 | 8/2017 | Chong et al. | |
| 2017/0235774 A1* | 8/2017 | Colgrove | G06F 16/22 |
| | | | 707/693 |
| 2017/0344703 A1 | 11/2017 | Ansari et al. | |
| 2018/0013583 A1 | 1/2018 | Rubenstein et al. | |
| 2018/0024873 A1 | 1/2018 | Milliron et al. | |
| 2018/0091417 A1 | 3/2018 | Ore et al. | |
| 2018/0198756 A1 | 7/2018 | Dawes | |
| 2020/0382341 A1 | 12/2020 | Ore et al. | |
| 2021/0044453 A1 | 2/2021 | Knutsen et al. | |
| 2021/0227028 A1 | 7/2021 | Rubenstein | |
| 2021/0342725 A1 | 11/2021 | Marsden et al. | |
| 2021/0345188 A1 | 11/2021 | Shaheen | |

FOREIGN PATENT DOCUMENTS

| | | |
|---|---|---|
| CN | 1536824 | 10/2004 |
| CN | 1754161 | 3/2006 |
| CN | 1829177 A | 9/2006 |
| CN | 101079896 A | 11/2007 |
| CN | 101282448 A | 10/2008 |
| CN | 101478533 | 7/2009 |
| CN | 101599888 | 12/2009 |
| CN | 101765172 | 6/2010 |
| CN | 101855865 | 10/2010 |
| CN | 101969414 A | 2/2011 |
| CN | 102006646 | 4/2011 |
| CN | 102209355 | 10/2011 |
| CN | 102255794 | 11/2011 |
| CN | 102340538 A | 2/2012 |
| CN | 102457539 A | 5/2012 |
| CN | 102687480 | 9/2012 |
| CN | 102739434 | 10/2012 |
| CN | 103118089 A | 5/2013 |
| CN | 103384992 | 11/2013 |
| CN | 103828297 | 5/2014 |
| CN | 104320472 | 1/2015 |
| EP | 1498809 | 1/2005 |
| EP | 1530761 A2 | 5/2005 |
| EP | 1635253 A2 | 3/2006 |
| EP | 2154834 | 2/2010 |
| EP | 2357763 | 8/2011 |
| JP | 6430499 B2 | 11/2018 |
| WO | 233551 | 4/2002 |
| WO | 2003025709 A2 | 3/2003 |
| WO | 03041360 A2 | 5/2003 |
| WO | 2003088047 | 10/2003 |
| WO | 2003090017 A2 | 10/2003 |
| WO | 2003090018 A2 | 10/2003 |
| WO | 2005065035 A2 | 7/2005 |
| WO | 2006055838 A2 | 5/2006 |
| WO | 2008058088 | 5/2008 |
| WO | 2008067323 A2 | 6/2008 |
| WO | 2010072030 | 7/2010 |
| WO | 2012100087 A2 | 7/2012 |
| WO | 2013068530 A2 | 5/2013 |
| WO | 2013120069 | 8/2013 |
| WO | 2013135753 | 9/2013 |
| WO | 2015021343 | 2/2015 |
| WO | 2016073361 | 5/2016 |
| WO | 2016094291 | 6/2016 |
| WO | 2016110785 | 7/2016 |
| WO | 2014381693 | 8/2016 |
| WO | 2016123293 | 8/2016 |
| WO | 2016162748 | 10/2016 |
| WO | 2016162749 | 10/2016 |
| WO | 2016164612 | 10/2016 |
| WO | 2016198961 A2 | 12/2016 |
| WO | 2018049649 | 3/2018 |

OTHER PUBLICATIONS

Robert Russell, "Introduction to RDMA Programming," Copyright 2012, retrieved from the Internet: URL:web.archive.orgweb20140417205540http:www.cs.unh.edu~rdrrdma-intro-module.ppt (76 pages) (previously submitted in related U.S. Appl. No. 16/095,910).

Extended European Search Report dated Dec. 11, 2019 received in related European Patent Application No. 17788882.3 (8 pages) (previously submitted in related U.S. Appl. No. 16/095,910).

"Open Radio Equipment Interface (ORI); ORI Interface Specification; Part 2: Control and Management (Release 4)," Group Specification, European Telecommunications Standards Institute (ETSI), 650, Route des Lucioles; F-06921 Sophia-Antipolis; France, ETSI GS ORI 002-2 V4.1.1, Oct. 1, 2014 (185 pages) (previously submitted in related U.S. Appl. No. 16/095,910).

Baumgartner, A., et al., "Mobile Core Network Virtualization: A Model for Combined Virtual Core Network Function Placement and Topology Optimization," Proceedings of the 1st IEEE Conference on Network Softwarization, NetSoft 2015, London, UK, Apr. 13-17, 2015, pp. 1-9, doi: 10.1109NETSOFT, 2015 (9 pages) (previously submitted in related U.S. Appl. No. 16/095,910).

Chen, Y., et al., "Resilient Virtual Network Service Provision in Network Virtualization Environments," 2010 IEEE 16th International Conference on Parallel and Distributed Systems, Shanghai, China, 2010, pp. 51-58, doi: 10.1109ICPADS.2010.26., Dec. 2010 (8 pages) (previously submitted in related U.S. Appl. No. 16/095,910).

Chowdhury, N.M.M.K. et al., "Virtual Network Embedding with Coordinated Node and Link Mapping", IEEE Communications

(56) References Cited

OTHER PUBLICATIONS

Society, INFOCOM 2009, Rio de Janerio, Brazil, Apr. 19-25, 2009, pp. 783-791, 2009 (9 pages) (previously submitted in related U.S. Appl. No. 16/095,910).
Definition of "backbone" in Microsoft Computer Dictionary, 2002, Fifth Edition, Microsoft Press (2 pages) (previously submitted in related U.S. Appl. No. 16/095,910).
Definition of "server" in Microsoft Computer Dictionary, 2002, Fifth Edition, Microsoft Press (3 pages) (previously submitted in related U.S. Appl. No. 16/095,910).
Examination Report, dated Aug. 2, 2018, for European Patent Application No. 16734942.2 (8 pages) (previously submitted in related U.S. Appl. No. 16/095,910).
Examination Report, dated Jul. 20, 2017, for Chinese Application No. 201680004969.3 (1 page)—Chinese Language (previously submitted in related U.S. Appl. No. 16/095,910).
Examination Report, dated Mar. 3, 2020, for Chinese Application No. 201680020937.2 (9 pages)—Chinese Language (previously submitted in related U.S. Appl. No. 16/095,910).
Examination Report, dated Mar. 5, 2020, for Chinese Patent Application No. 201580066318.2 (10 pages)—Chinese Language (previously submitted in related U.S. Appl. No. 16/095,910).
Examination Report, dated Oct. 19, 2018, for European Patent Application No. 16727220.2 (11 pages) (previously submitted in related U.S. Appl. No. 16/095,910).
Extended European Search Report dated Sep. 7, 2018, received in related European Patent Application No. 16744078.3 (7 pages) (previously submitted in related U.S. Appl. No. 16/095,910).
Extended European Search Report, dated Aug. 2, 2018, for European Patent Application No. 15866542.2 (8 pages) (previously submitted in related U.S. Appl. No. 16/095,910).
Extended European Search Report, dated Sep. 7, 2018, for European Patent Application No. 16777297.9 (4 pages) (previously submitted in related U.S. Appl. No. 16/095,910).
Extended Search Report, dated Nov. 29, 2018, for European Patent Application No. 16806960.7 (10 pages) (previously submitted in related U.S. Appl. No. 16/095,910).
Figueiredo, R. J., et al., "Social VPNs: Integrating Overlay and Social Networks for Seamless P2P Networking," 2008 IEEE 17th Workshop on Enabling Technologies: Infrastructure for Collaborative Enterprises (WET ICE), Rome, Italy, Jun. 23-25, 2008, pp. 93-98, doi: 10.1109WETICE.2008.43, 2008 (6 pages) (previously submitted in related U.S. Appl. No. 16/095,910).
First Office Action, dated Jun. 3, 2020, for Chinese Patent Application No. 201680066545.X (11 pages) (previously submitted in related U.S. Appl. No. 16/095,910).
Gong, L. et al., "Revenue-Driven Virtual Network Embedding Based on Global Resource Information", Globecom 2013, Next Generation Networking Symposium, pp. 2294-2299, 2013 (6 pages) (previously submitted in related U.S. Appl. No. 16/095,910).
Haeri, S. et al., "Global Resource Capacity Algorithm with Path Splitting for Virtual Network Embedding", 2016 IEEE International Symposium on Circuits and Systems (ISCAS), pp. 666-669, May 2016 (4 pages) (previously submitted in related U.S. Appl. No. 16/095,910).
International Search Report and Written Opinion, issued by the U.S. Patent and Trademark Office as International Searching Authority, mailed Jul. 7, 2016, for International Application No. PCTUS2016026489 (7 pages) (previously submitted in related U.S. Appl. No. 16/095,910).
International Search Report and Written Opinion, issued by the U.S. Patent and Trademark Office as International Searching Authority, mailed Apr. 8, 2016, for International Application No. PCTUS2016015278 (9 pages) (previously submitted in related U.S. Appl. No. 16/095,910).
International Search Report and Written Opinion, issued by the European Patent Office as International Searching Authority, mailed Aug. 10, 2016, for International Application No. PCTIB2016000531 (20 pages) (previously submitted in related U.S. Appl. No. 16/095,910).
International Search Report and Written Opinion, issued by the State Intellectual Property Office of the P.R. China as International Searching Authority, mailed Aug. 23, 2017, for International Application No. PCTIB2017000580 (6 pages) (previously submitted in related U.S. Appl. No. 16/095,910).
International Search Report and Written Opinion, issued by the State Intellectual Property Office of the P.R. China as International Searching Authority, mailed Dec. 28, 2016, for International Application No. PCTIB2016001161 (10 pages) (previously submitted in related U.S. Appl. No. 16/095,910).
International Search Report and Written Opinion, issued by the U.S. Patent and Trademark Office as International Searching Authority, mailed Feb. 12, 2016, for International Application No. PCTUS2015064242 (9 pages) (previously submitted in related U.S. Appl. No. 16/095,910).
International Search Report and Written Opinion, issued by the State Intellectual Property Office of the P.R. China as International Searching Authority, mailed Jul. 28, 2017, for International Application No. PCTIB2017000557 (6 pages) (previously submitted in related U.S. Appl. No. 16/095,910).
International Search Report and Written Opinion, issued by the State Intellectual Property Office of the P.R. China as International Searching Authority, mailed Jun. 7, 2016, for International Application No. PCTIB2016000110 (8 pages) (previously submitted in related U.S. Appl. No. 16/095,910).
International Search Report and Written Opinion, issued by the State Intellectual Property Office of the P.R. China as International Searching Authority, mailed May 11, 2017, for International Application No. PCTIB2016001867 (13 pages) (previously submitted in related U.S. Appl. No. 16/095,910).
International Search Report and Written Opinion, issued by the State Intellectual Property Office of the P.R. China as International Searching Authority, mailed Sep. 1, 2017, for International Application No. PCTIB2017000613 (7 pages) (previously submitted in related U.S. Appl. No. 16/095,910).
International Search Report and Written Opinion, issued by the European Patent Office as International Searching Authority, mailed Sep. 23, 2016, for International Application No. PCTIB2016000528 (11 pages) (previously submitted in related U.S. Appl. No. 16/095,910).
Office Action, dated Mar. 12, 2020, for Chinese U.S. Appl. No. 16/095,910.3 (5 pages)—Chinese Language (previously submitted in related U.S. Appl. No. 16/095,910).
Office Action, dated Mar. 13, 2020, received in related Chinese Patent Application No. 201680021239.4 (9 pages)—Chinese Language (previously submitted in related U.S. Appl. No. 16/095,910).
Office Action, dated May 7, 2020, for Chinese Patent Application No. 201680020878.9 (7 pages)—Chinese Language (previously submitted in related U.S. Appl. No. 16/095,910).
Supplementary Partial European Search Report, dated May 20, 2019, for European Patent Application No. 16872483.9 (8 pages) (previously submitted in related U.S. Appl. No. 16/095,910).
Szeto, W. et al., "A Multi-Commodity Flow Based Approach to Virtual Network Resource Allocation," GLOBECOM 2003. IEEE Conference and Exhibition on Global Telecommunications (IEEE Cat. No. 03CH37489), San Francisco, CA, USA, Dec. 1-5, 2003, pp. 3004-3008, doi: 10.1109GLOCOM.2003.1258787, 2003 (5 pages) (previously submitted in related U.S. Appl. No. 16/095,910).
Non-Final Office Action issued in related U.S. Appl. No. 16/095,910 on May 2, 2022, 15 pages.
Final Office Action issued in related U.S. Appl. No. 16/095,910 on Nov. 14, 2022, 17 pages.
Notice of Allowance issued in related U.S. Appl. No. 16/095,910 on Apr. 10, 2023, 11 pages.

* cited by examiner

SYSTEMS AND METHODS FOR ROUTING DATA TO A PARALLEL FILE SYSTEM

RELATED APPLICATIONS

This application is a continuation of U.S. Non-Provisional Application Ser. No. 16/095,910, filed on Oct. 23, 2018, which is a U.S. National Stage application under 35 U.S.C. § 371 of International Patent Application No. PCT/IB2017/000557, filed on Apr. 26, 2017, which claims priority to U.S. Provisional Application No. 62/327,907, filed on Apr. 26, 2016; U.S. Provisional Application No. 62/327,846, filed on Apr. 26, 2016; and U.S. Provisional Application No. 62/327,911, filed on Apr. 26, 2016, all of which are incorporated herein by reference.

This application also relates to the following applications, content of which are hereby incorporated by reference: International Patent Application Nos., PCT/IB16/01867, filed on Dec. 9, 2016; PCT/US15/64242, filed on Dec. 7, 2015; PCT/IB16/00110, filed on Jan. 5, 2016; PCT/US16/15278, filed on Jan. 28, 2016; PCT/IB16/00528, filed on Apr. 7, 2016; PCT/IB16/00531, filed on Apr. 7, 2016; PCT/US16/26489, filed on Apr. 7, 2016: PCT/IB16/01161, filed on Jun. 13, 2016.

BACKGROUND OF THE INVENTION

Technical Field

The present disclosure relates generally to networks, and more particularly to routing of slingshot mechanism for one way transport via backbone over distance.

Description of the Related Art

The internet uses ubiquitous protocols Transmission Control Protocol/Internet Protocol (TCP/IP) and User Datagram Protocol/Internet Protocol (UDP/IP) over Ethernet. The main features of these protocols are standardized peering, routing, handling of, and the sending or relaying data packets from one point to another. A global virtual network is an over-the-top (OTT) construct laid over the internet. A network tapestry weaves multiple different network fabrics together into a tapestry.

Slingshot is a transport mechanism between known points sending unlimited sized data files over long distances utilizing remote direct memory access (RDMA) to write files to remotely located parallel file system (PFS) devices over InfiniBand (IB) over distance or equivalent network type which can send files via RDMA over distance through a fiber back bone. In the example of using IB, its IB switches and IB devices at either end of a fiber line constitute the physical plumbing layer on top of which Slingshot operates. Other network types may need other types of end-point devices at either end of the line.

The granularity of a tick governs the timing synchronization and time interval period which coordinates sling activity. Data Beacon Pulser (DBP) is a technology which utilizes Slingshot to send a constant stream of pulses of information from one region to one or more other regions. Slinghop is a technology which integrates as a network segment within an existing Internet Protocol (IP) pathway of segments, and it uses Slingshot as a transport technology over long distances to reliably speed up transfer.

There are various drawbacks associated with prior art technologies. The internet is a network of networks built specifically to robustly address peering issues, congestion, routing inefficiencies, and other impediments to traffic flow across various network boundaries, and constriction points through various peering points. Hops across joint points of two segments are subject to a delay due to the inherent limitations of the internet protocol. IP is a store and forward model where a packet is received in its entirety before being passed on adding a tiny time delay through each device. A global virtual network (GVN) runs over-the-top (OTT) of the internet or other network fabrics, and it offers advantages, but it still must contend with the core problem of IP inefficiency over distance. While InfiniBand (IB) is a cut-through network model, is fast and is parallel, one limitation is its point to point topology for IB over distance. Slingshot to a PFS cluster or device in a remote region addresses the speed and reliability problems mentioned above for long-haul IP traffic. However, there remains a need to efficiently route Slingshot traffic to a specific region, at a certain quality of service (QOS), and to assert other control over routing, while concurrently routing other traffic to other regions with the same degree of control.

SUMMARY OF THE DISCLOSURE

Slingroute or Slingrouting is the name for various related methods to route the sending of data "files" via slingshot from one region to another region based on the choice of target parallel file system (PFS) device and other options.

Slingshot at the physical layer makes all PFS devices reachable and addressable. Therefore, Slingshot to a specific PFS which is coupled with a sling node (SLN) and/or backbone exchange server (SRV_BBX) in a target region forms the basis of routing. See FIG. 9. Each access point server (SRV_AP) can send traffic to any other SRV_AP via Slingshot. Each access point server (SRV_AP) can receive traffic from any other SRV_AP via Slingshot.

Direct write and load balanced write to PFS ensure high availability and failover. FIG. 10 describes multiple Sling nodes (SLN) at each node, with multiple PFS devices. High availability is also achieved with multiple PFS device instances and cluster options where SLNs can reach some or all PFS devices. An SLN can also send results to multiple SRV_BBX for load balancing and failover.

Sling availability module operating on a central control server (SRV_CNTRL) receives reports about each PFS, SLN, SRV_BBX, connectivity, and other elemental devices which constitute a Slingshot mechanism. The sling availability module evaluates the report data and determines which devices are over-utilized, which are under-utilized, those that are not available due to maintenance or malfunction, or other related events. It further ranks which devices are contextually available to other devices so that availability lists are catered in such a way for maximum benefit of its user as well as anticipating and addressing potential issues which can otherwise occur by randomly assigning for devices to arbitrarily jump to random devices.

Sling availability module reports on SRV_CNTRL also offers a real-time understanding of load, historical analysis, and other information for system health initiatives such as maintenance as well as provision of new hardware (HW) devices and other related actions. It also measures backbone pipe sizes and current utilization to govern use.

The Slingroute module itself also offers a targeted routing mechanism to not just a PFS but also to one of various folders on that PFS. These folders can be used to run parallel batch file processes, as well as to apply different quality of service (QOS) to each folder. For example, some folders can be read more frequently than others such as in the case of financial information conveyance or trade order or trade confirmation passing. These shorter and more frequent intervals ensure that the Slingshot mechanism adds as minimal time delay as possible. Other folder QoS like large file transfer can be at longer intervals and called comparatively less frequently while still not impacting client performance expectations.

Slingroute forms the basis for targeting the sending of data via Data Beacon Pulser (DBP), Slinghop, and other related sling technologies.

Slingroute leverages slingshot's reliability to send data as fast as possible to exact target destination in a highly controlled and predictable manner. Being able to place files in exact folder in specific location for the best sling node (SLN) and backbone exchange server (SRV_BBX) to fetch and use data is a vast improvement over IP routing and transport, as well as over a basic Slingshot mechanism without Slingrouting.

Addressable, automated routing of sling transfers of files to PFS folders are determinable with exact time for deliver to be predicted. Slingroute QoS to a specific folder can also specify a number of parallel streams to send data which has a direct impact on delivery time of last byte after receipt of first byte. The folder itself can determine the regularity of processing of batches of received files for control over QoS or various types of data and can therefore be differential based on best use.

Slingroute integrates easily into the sling ecosystem. It enhances Slingshot, Slinghop, Data Beacon Pulser (DBP) and other sling related technologies. It further enhances the integration of Sling technology into a GVN.

Disclosed systems and methods offer the ability to route data with options using Slingshot, Slinghop, DBP, and other related sling technologies to send to the most appropriate PFS in the target region and also with built-in choice of quality of service (QoS) based on which folder on target PFS that the file is written to. Granularity of a Tick governs the sequencing of the file reads in the remote regions when the folder is accessed by sling nodes (SLN). Higher priority items can be processed more frequently in batches with higher levels of central processing unit (CPU), random-access memory (RAM), and other resources committed to the fastest handling as possible by the SLN. Lower priority items can be accessed less frequently, committing fewer resources for those read batches. Slingroute offers sending addressing by Region identifier (ID), IP address, PFS+ Folder Name, Unique folder name, other label and/or other addressing systems. The receiving devices can also know the source region of the incoming files based on the folder that the file was written into. This can also be a factor in determining sequencing, priorities, and other aspects of sling transfers. This information available to both the sender and the receiving devices can also be a factor in making sling transfer as efficient as possible. Slingroute also presents the ability to have high availability for sling transfers which are transparent to both senders and receivers. More devices can be added to the pool at either end and to fulfill their roles, and those devices which are broken, need maintenance, overloaded, or otherwise not available can be bypassed without interruption to the flow of data.

BRIEF DESCRIPTION OF DRAWINGS

In order to facilitate a fuller understanding of the present disclosure, reference is now made to the accompanying drawings, in which like elements are referenced with like numerals or references. These drawings should not be construed as limiting the present disclosure, but are intended to be illustrative only.

DETAILED DESCRIPTION

In the following description, numerous specific details are set forth regarding the systems, methods and media of the disclosed subject matter and the environment in which such systems, methods and media may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems, methods, and media that are within the scope of the disclosed subject matter.

Figure 1:
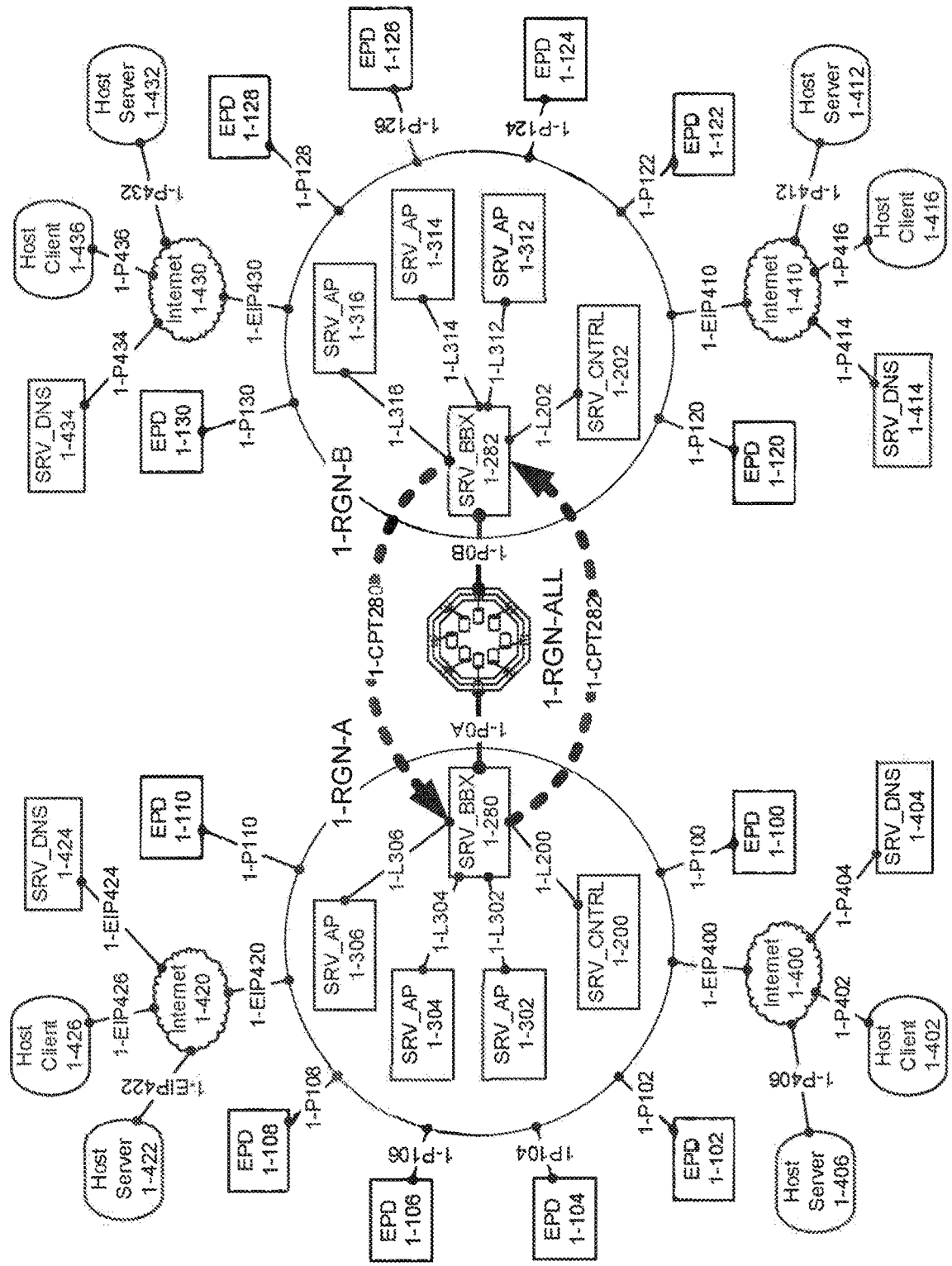
FIG. 1 illustrates a global virtual network (GVN).

FIG. 1 illustrates a global virtual network (GVN). This figure demonstrates a GVN integrated as an over-the-top (OTT) layer over the internet. Another example embodiment illustrated is a slingshot cluster in the middle 1-RGN-ALL via 1-CPT280 and 1-CPT282. FIG. 1 illustrates a global virtual network (GVN) or similar globally distributed network using hub and spoke topology with octagon routing on the backbone, with egress/ingress points (EIP) noted. The octagon shape is for illustrative purposes only—the physical construct can be any shape topology.

FIG. 1 shows the network topology of a GVN in two different regions 1-RGN-A and 1-RGN-B and how the regions are connected via paths 1-P0A and 1-P0B through global connectivity 1-RGN-ALL. In addition, FIG. 1 demonstrates the hub & spoke connections in each of the two regions. The multiple egress-ingress points (EIP) 1-EIP400, 1-EIP420, and 1-EIP410, 1-EIP430 in each region are added spokes to the hub and spoke model.

SRV_BBX 1-280 and SRV_BBX 1-282 are backbone exchange servers (SRV_BBX) and provide the global connectivity. A SRV_BBX may be placed as one or more load-balanced servers in a region serving as global links to other regions. Access point servers (SRV_AP) 1-302, 1-304 and 1-306 in 1-RGN-A connect to SRV_BBX 1-280-via 1-L302, 1-L304, and 1-L306, respectively. Access point servers (SRV_AP) 1-312, 1-314 and 1-316 in 1-RGN-B connect to SRV_BBX 1-282-via 1-L312, 1-L314, and 1-L316, respectively.

The central, control server (SRV_CNTRL) 1-200 serves all the devices within that region, and there may be one or more multiple master SRV_CNTRL servers. The central, control server SRV_CNTR 1-200 can connect to the backbone exchange server SRV_BBX 1-282 via 1-L200. Endpoint devices (EPD) 1-100 through 1-110 will connect with one or more multiple SRV_AP servers through one or more multiple concurrent tunnels. For example, EPD 1-100 through 1-110 can connect to the region 1-RGN-A via tunnels 1-P100 through 1-P110.

The central, control server (SRV_CNTRL) 1-202 serves all the devices within that region, and there may be one or more multiple master SRV_CNTRL servers. The central, control server SRV_CNTR 1-202 can connect to the backbone exchange server SRV_BBX 1-282 via 1-L202. Endpoint devices (EPD) 1-120 through 1-130 will connect with one or more multiple SRV_AP servers through one or more multiple concurrent tunnels. For example, EPD 1-120 through 1-130 can connect to the region 1-RGN-B via tunnels 1-P120 through 1-P130.

This figure further demonstrates multiple egress ingress points (EIP) 1-EIP420, 1-EIP400, 1-EIP430, and 1-EIP410 as added spokes to the hub and spoke model with paths to and from the open internet. This topology can offer EPD connections to an EIP in remote regions routed through the GVN. In the alternative, this topology also supports EPD connections to an EIP in the same region, to an EPD in the same region, or to an EPD in a remote region. These connections are securely optimized through the GVN. This also facilitates the reaching of an EPD from the open internet with traffic entering the EIP nearest to the source and being carried via the GVN realizing the benefits of the GVN's optimization.

In some embodiments, a host server, a host client, and a DNS server can connect to an egress ingress point via the internet. Example host servers include host servers 1-406, 1-412, 1-422, 1-432 that can connect to the internet 1-400, 1-410, 1-420, 1-430 via 1-P-406, 1-P-412, 1-EIP-422, 1-P432, respectively. Example host clients include host clients 1-402, 1-416, 1-426, 1-436 that can connect to the internet 1-400, 1-410, 1-420, 1-430 via 1-P402, 1-P416, 1-EIP426, 1-P436, respectively. Example DNS servers include SRV_DNS 1-404, 1-414, 1-424, 1-434 that can connect to the internet 1-400, 1-410, 1-420, 1-430 via 1-P404, 1-P414, 1-EIP424, and 1-P434.

RGN means Ring Global Node(s) or Regional Global Node(s). RGN_ALL means All Linked Global Nodes. "Managed by MRGN" means Manager of Regional Global Nodes or Mesh of Regional Global Nodes.

Figure 2:
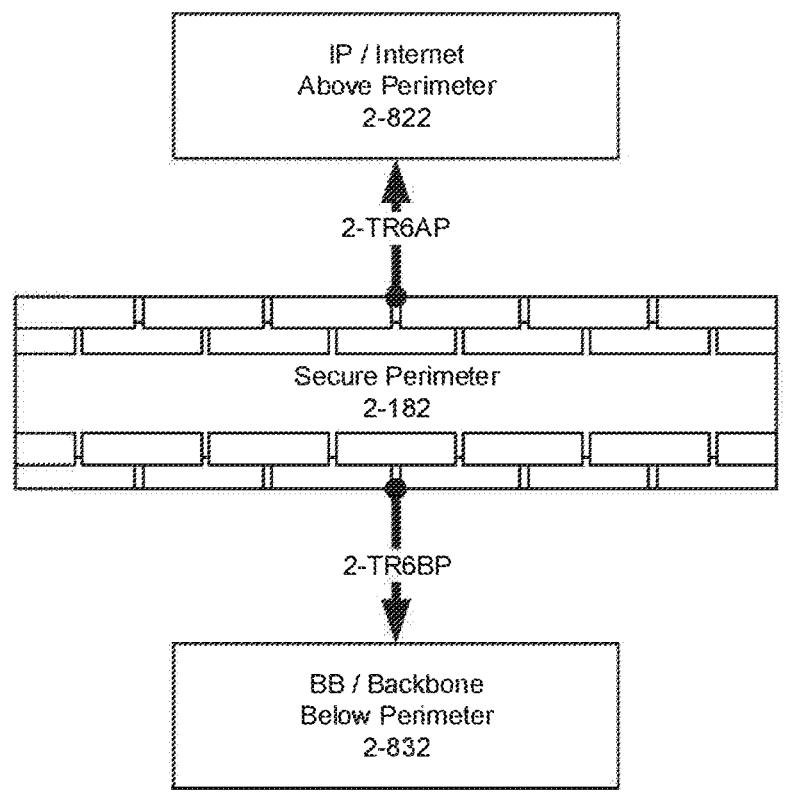
FIG. 2 illustrates a Secure Perimeter with GVN above and infrastructure layer below.

FIG. 2 illustrates a Secure Perimeter with GVN above and infrastructure layer below. There exists a Secure Perimeter 2-182 which is between the IP/Internet layer 2-822 and the BB/Backbone layer 2-832. The Secure Perimeter2-182 can function with firewall type operations to isolate the above layers from the layers below. Another built-in protection concerns the nature of the transport. Packets travel along path 2-TR6AP, and files are written via RDMA to PFS devices via path 2-TR6BP. Files cannot natively move at the IP layer, and packets cannot be transported via the BB layer.

Figure 3:
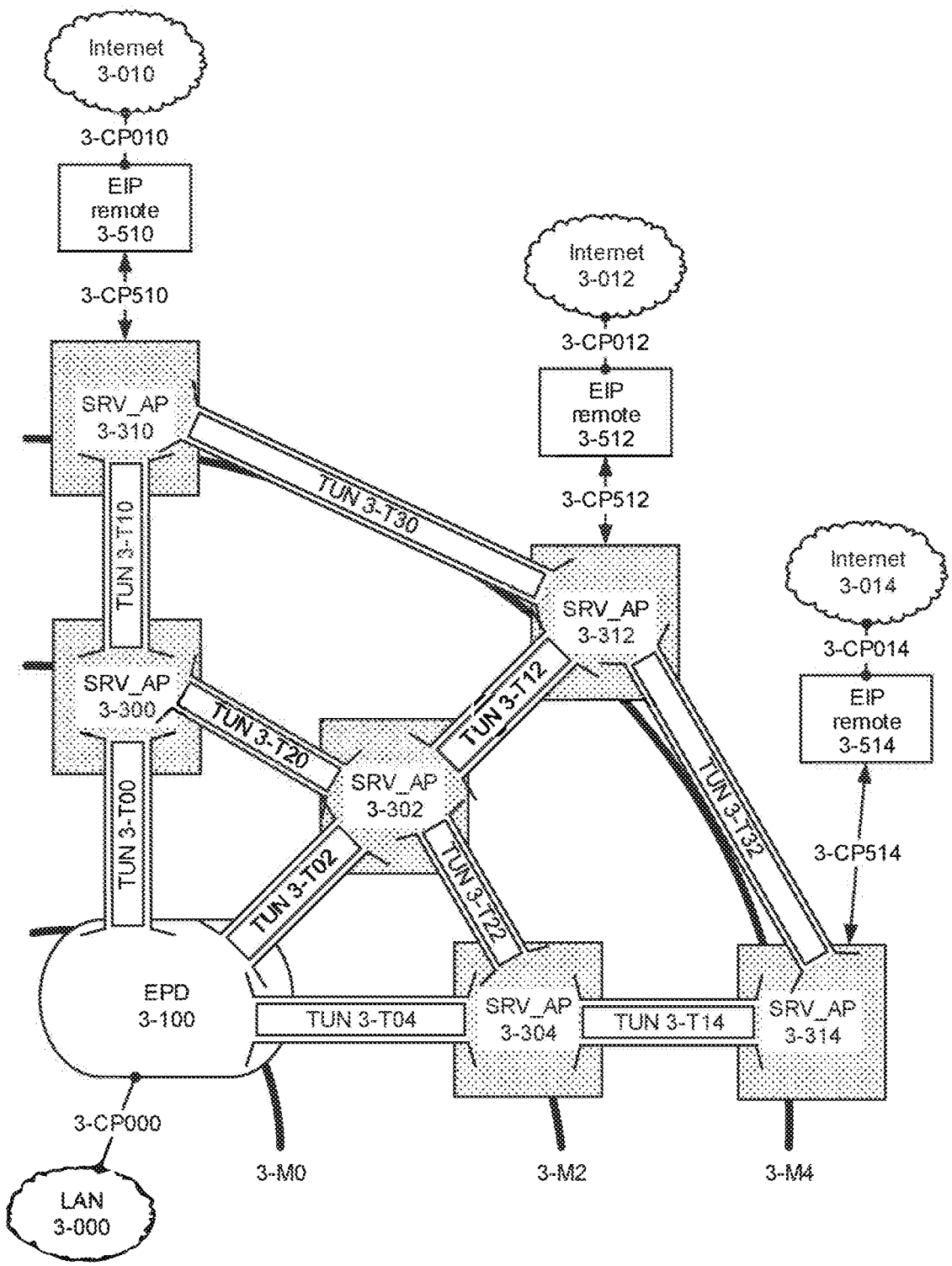
FIG. 3 illustrates a GVN Topology with routing via internal hops of construct OTT.

FIG. 3 illustrates a GVN Topology with routing via internal hops of construct OTT. This example embodiment demonstrates multiple tunnels between devices within a global virtual network (GVN) across multiple regions. The EPD 3-100 is in one location 3-M0. SRV_APs in region 3-M2 are SRV_AP 3-300, SRV_AP 3-302, and SRV_AP 3-304. SRV_APs in region 3-M4 are SRV_AP 3-310, SRV_AP 3-312, and SRV_AP 3-314. EPD 3-100 can be linked to SRV_APs 3-300, 3-302, 3-304 via tunnels TUN 3-T00, 3-T02, 3-T04, respectively. SRV_AP 3-300 can be linked to SRV_AP 3-302 via tunnel TUN 3-T20. SRV_AP 3-302 can be linked to SRV_AP 3-304 via tunnel TUN 3-T22. SRV_AP 3-300 can be linked to SRV_AP 3-310 via tunnel TUN 3-T10. SRV_AP 3-302 can be linked to SRV_AP 3-312 via tunnel TUN 3-T12. SRV_AP 3-304 can be linked to SRV_AP 3-314 via tunnel TUN 3-T14. SRV_AP 3-310 can be linked to SRV_AP 3-312 via tunnel TUN 3-T30. SRV_AP 3-312 can be linked to SRV_AP 3-314 via tunnel TUN 3-T32. LAN 3-000 can connect to EPD 3-100 via 3-CP000. The SRV_AP 3-310 can connect to EIP remote 3-510 via 3-CP510. EIP remote 3-510 can connect to the internet 3-010 via 3-CP010. The SRV_AP 3-312 can connect to EIP remote 3-512 via 3-CP512. EIP remote 3-512 can connect to the internet 3-012 via 3-CP012. The SRV_AP 3-314 can connect to EIP remote 3-514 via 3-CP514. EIP remote 3-514 can connect to the internet 3-014 via 3-CP014.

There is a need to mitigate the risk of looping, wrong geographic destination routing, ASR remote redirect backtrack, broken links between SRV_APs, regions, and other problems. This is managed by routing and other techniques both on the EPD and on other devices within the GVN.

Figure 4:
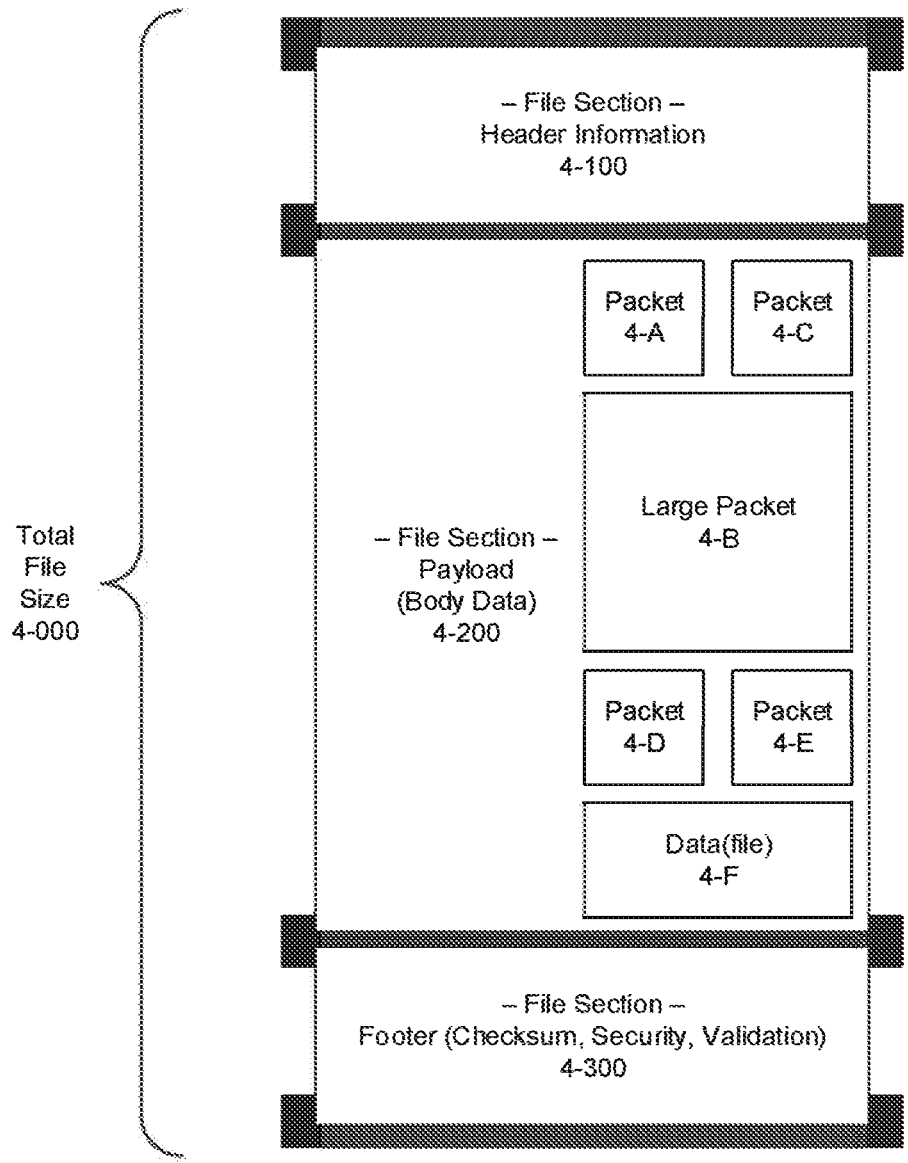
FIG. 4 illustrates a Slinghop with composition of file as clump of packets.

FIG. 4 illustrates Slinghop with composition of file as clump of packets. This figure describes a "carrier" file which is sent via slingshot consisting of a payload of packets in the Body Data 4-200. This example embodiment describes a file of data organized in three defined sections: Header Information 4-100, Payload 4-200 containing Body Data, and a Footer 4-300. This file could be stored in RAM, memory, saved to disk, or otherwise stored in another form of memory or storage.

Header can contain information about host origin, host destination, timestamp, and other information. Security information can be stored in fields in both the header and the footer section. This security information may hold references to keys to use for decryption, as well as other information.

Payload (Body Data) may be encrypted in whole or in part, or sent unencrypted. Payload checksum in the footer is used to validate the integrity of the body data. EOF notation in the Footer will indicate that the file has arrived, is complete and ready to be validated/verified for accuracy and then ultimately used.

This figure illustrates various small packets such as Packets 4-A, 4-C, 4-D, or 4-E, or larger packets such as Packet 4-B. It also illustrates the inclusion of a data file 4-F. These are combined when the file is created by the origin sling node (SLN) and are separated into separate packets when the file is accessed and utilized by the SLN at the other end of the Slingshot path. The number and size of contents in the payload (body data) 4-200 of this example embodiment are for illustrative purposes only and in practical use, the number, size, configuration of elements within the payload are different and varied. Total file size 4-000 can be the sum of header information size, payload size, and footer size.

Figure 5:
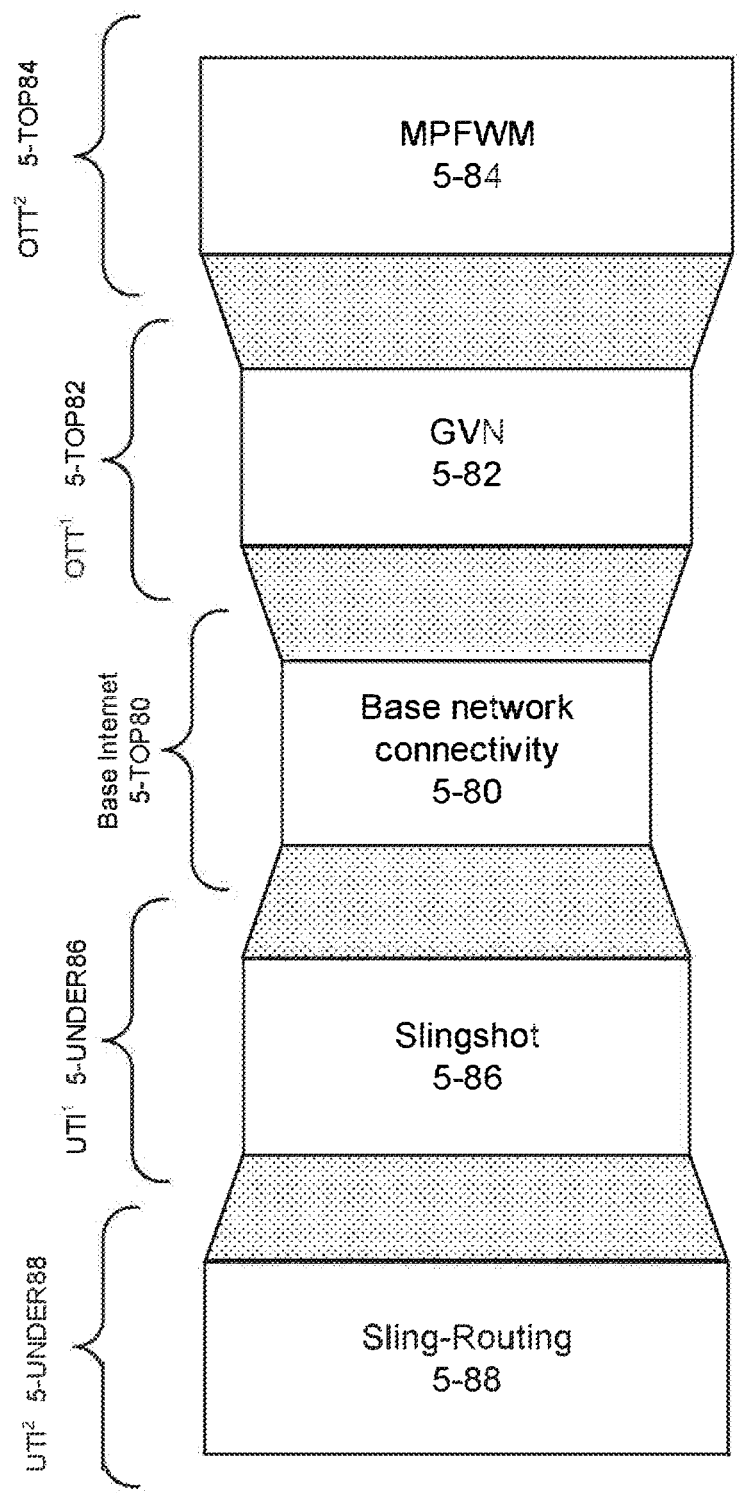
FIG. 5 illustrates layers either over the top (OTT) or under the internet (UTI).

FIG. 5 illustrates layers either over the top (OTT) or under the internet (UTI). This figure presents the example embodiments of various layers of the GVN, starting at the Base network connectivity 5-80 of the Internet 5-TOP80. The Global virtual network (GVN) is over-the-top of the internet (OTT) and in this scope, is a first-degree OTT or $OTT^1$. An example of a second-degree OTT or $OTT^2$ 5-TOP84 is the Multi-perimeter firewall mechanism (MPFWM 5-84) The basic slingshot mechanism in this scope is a first degree under-the-internet (UTI) or $UTI^1$ and the Slingrouting is a second degree UTI or $UTI^2$. FIG. 5 indicates the level where Slingshot BB5-86 fits into a topological hierarchy as $UTI^1$ 5-UNDER86. $OTT^1$ indicates first degree over-the-top of the internet. $OTT^2$ indicates second degree over-the-top of the internet, meaning that it is over-the-top of an $OTT^1$ element. $UTI^1$ indicates first degree under-the-internet layer. $UTI^2$ indicates second degree under-the-internet layer which is below the $UTI^1$ element. OTT and UTI are used for descriptive purposes only to indicate the layering of relationships and interactions. At the physical layer, all types of protocols may exist at the same level or at different levels than illustrated herein. Global virtual network (GVN 5-82) is at layer $OTT^1$ 5-TOP82 which is built upon the basic plumbing of the Base Internet 5-TOP80 on top of ISP network connectivity 5-80. The Sling routing BB 5-88 mechanism is a second degree UTI at layer $OTT^2$ 5-UNDER88. It utilizes the $UTI^1$ technology of Slingshot BB 5-86. The product of its functionality can be integrated into the flow of GVN 5-82 which is at layer $OTT^1$ 5-TOP82 or integrated as a segment in an internet path at level Base Internet 5-TOP80. An example of second degree OTT of MPFWM 5-84 at layer $OTT^2$ 5-TOP84 is noted for illustrative purposes only. In live implementations, it may or may not be integrated into the traffic flow.

Figure 6:
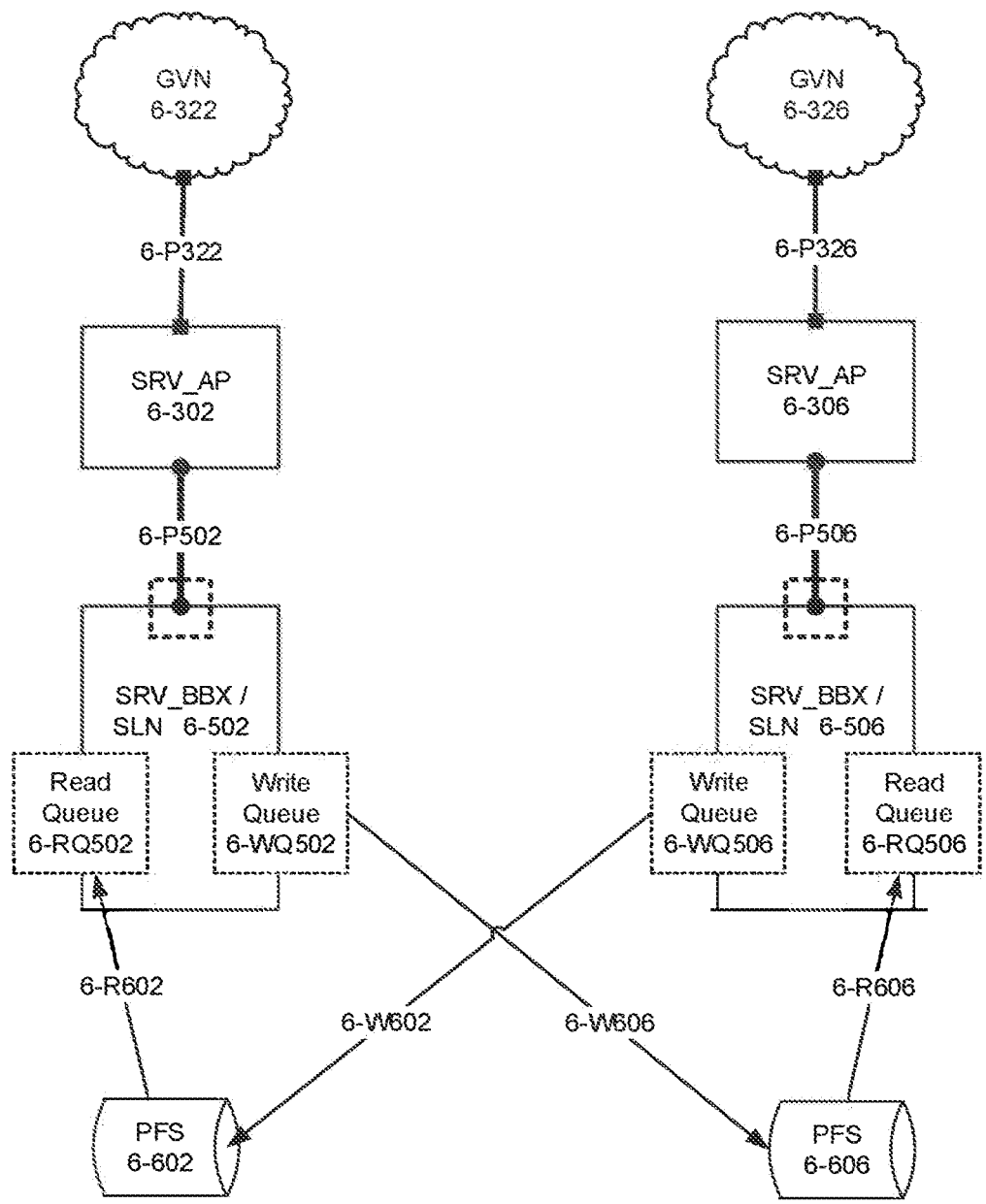
FIG. 6 illustrates Slingshot with two or more Slingshot nodes working in unison.

FIG. 6 illustrates Slingshot with two or more slingshot nodes working in unison. This figure demonstrates the operation of two independent slingshot mechanisms (see U.S. Provisional Patent Application No. 62/266,060 or PCT/IB16/00110) juxtaposed with each other and overlaid into an integrated relationship.

Traffic flows from the first region's global virtual network (GVN) 6-322 to the second region GVN 6-326 following this pathway: to the access point server (SRV_AP) 6-302 via 6-P322 and onto backbone exchange server (SRV_BBX) 6-502. At this point, the slingshot mechanism on SRV_BBX 6-502 via its Write Queue 6-WQ502 function converts the packetized traffic into a combined carrier file and directly writes this carrier file via path 6-W606 to the parallel file system (PFS) storage node 6-606. The Read Queue 6-RQ-506 function of SRV_BBX 6-506 retrieves the carrier file from PFS 6-606 via 6-R606 and then it separates the carrier file back into individual packets which are sent to SRV_AP 6-306 via path 6-P506 and then onto the GVN 6-326 via 6-P326. GVN is provided as an example and in real-world practical use, slingshot could be integrated into another network type.

Traffic flows from GVN 6-326 to GVN 6-322 following this pathway: to the access point server (SRV_AP) 6-306 via 6-P326 and onto backbone exchange server (SRV_BBX) 6-506. At this point, the slingshot mechanism on SRV_BBX 6-506 via its Write Queue 6-WQ506 function converts the packetized traffic into a combined carrier file and directly writes this file via path 6-W602 to the parallel file system (PFS) storage node 6-602. The Read Queue 6-RQ-502 function of SRV_BBX 6-502 retrieves the carrier file from PFS 6-602 via 6-R602 and then it separates the carrier file back into individual packets which are sent to SRV_AP 6-302 via path 6-P502 and then on to the GVN 6-322 via 6-P322.

Each one-way communication path is powered by Slingshot as defined in US 62/266,060 noted above. Together, these two nodes and their corresponding communication paths work in unison to form the basis of the underlying Slinghop technology.

Figure 7:
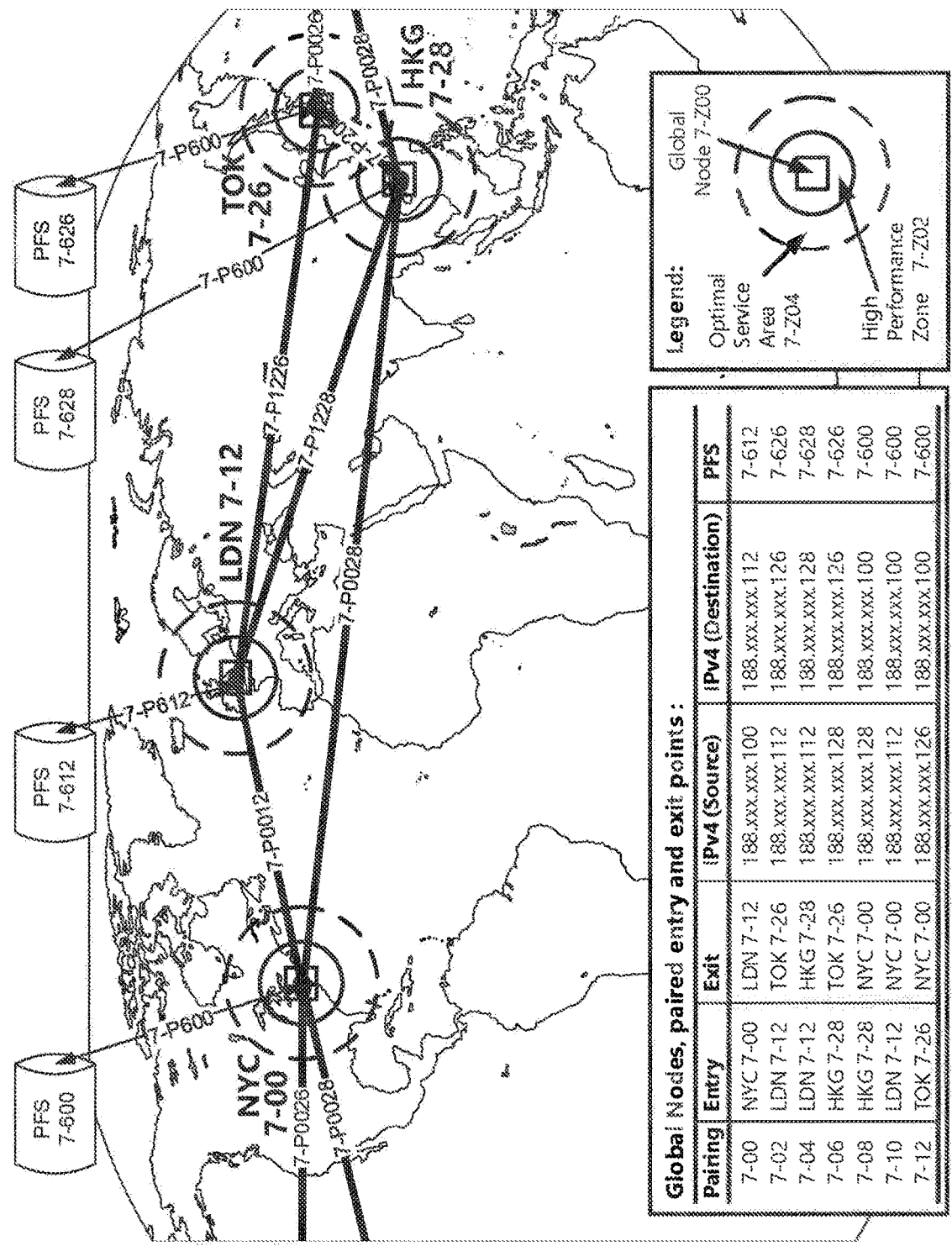
FIG. 7 illustrates Slingshot with End Points Pairs (EPP) Topology overlaid on map of northern hemisphere.

FIG. 7 illustrates Slingshot with End Points Pairs (EPP) Topology overlaid on map of northern hemisphere. This figure demonstrates the geographic placement of a few global nodes of a GVN, and example connectivity paths. For illustrative purposes, the lines are drawn as straight lines between points. Due to political/administrative boundaries, cities limits, zoning, geographic features such as bodies of water, various elevation changes, and other reasons, the actual routes of pipes are rarely ever straight or direct. However, the additional distance caused by path deviations from the potentially most direct route do not add enough distance to have a significantly adverse effect of added latency. It is assumed that the lines follow the most optimal path possible, and enhancements herein focus on efficiency of utilization of these lines. For illustrative purposes, segments can be described as city or location pairs and for Slinghop purposes, the origin end-point of the Slinghop is represented by an IP Address or hostname or other label of a server or gateway device there, with segment transiting over the Slinghop segment to IP address or hostname or other label of the server or gateway device at the target end-point city/location. Transit from one location to the other is as simple as from origin IP address to target IP address and for the return path the IP addresses are in reciprocal order. This single Slinghop segment replaces many other IP segments over the internet and is optimized by Slingshot.

PFS naming can be based on last octet or last 2 octets of an IP address or other such hostname or other label naming scheme. PFS naming can also include city code, region, IP Address, noted world nodes, and more factors. IP address pairs denote bridgeheads at either end of a segment. For example, from 188.xxx.xxx.100 to 188.xxx.xxx.112 means that Slingshot will write to PFS 7-612, or in other terms, and traffic from New York City NYC 7-00 will be directly written to a PFS 7-612 in London LDN 7-12. And for return traffic, from 188.xxx.xxx.112 to 188.xxx.xxx.100 means that Slingshot will write to PFS 7-600, or in other terms, and traffic from London LDN 7-12 will be directly written to PFS 7-600 in New York NYC 7-00.

Like airline routes for roundtrips, the combination of two one-way segments constitute a Slinghop transparent roundtrip integration nested into an existing IP pathway. And to further this analogy, sling-routed traffic can be one way and or to various routes concurrently.

In the event of failure of one link such as 7-P1226 from London LDN 7-12 to Tokyo TOK 7-26, Slingroute can either save data to HKG 7-28 and then save this data to TOK 7-26 or it can relay through HKG 7-28 for save to TOK 7-26. Other such re-directs and re-routes can be utilized by Slingroute to get data to destination if the most direct path is compromised or otherwise unavailable.

Various paths or links (e.g., 7-P600, 7-P612, 7-P0026, 7-P0028, 7-P0012, 7-P1226, 7-P1228, 7-P20) can be made between cities, or between a city and a PFS (e.g., PFS 7-600, PFS 7-612, PFS 7-628, PFS 7-626).

Figure 8:
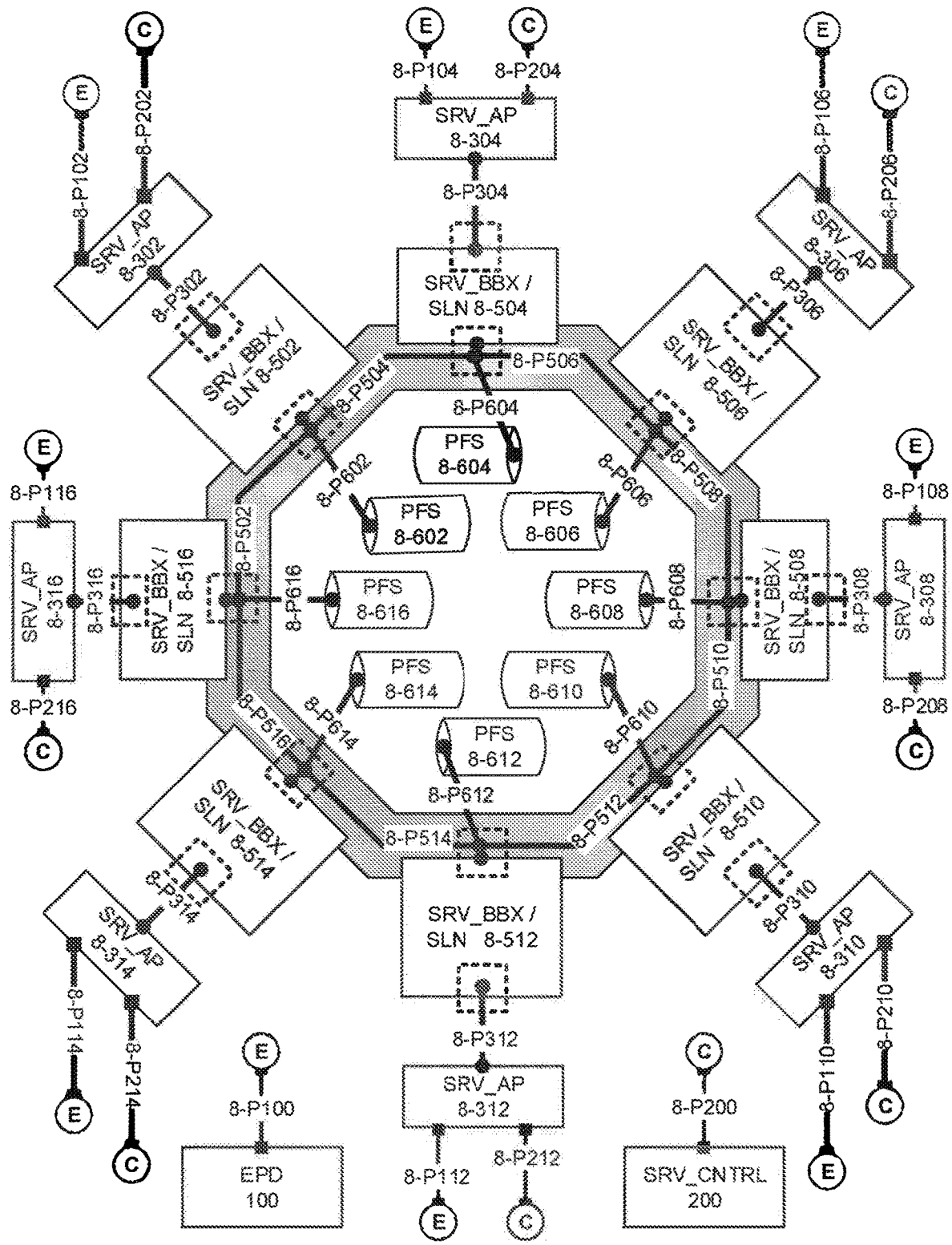
FIG. 8 illustrates Sling-Routing with Ring of Global Nodes.

FIG. 8 illustrates Sling-Routing with Ring of Global Nodes. This figure demonstrates the Slinghop internals and operations with respect to topological structure. This figure is not to scale nor is the octagonal shape of any significance other than being able to organize information for human visual understanding. It demonstrates how backbone exchange servers (SRV_BBX) and sling nodes (SLN) 8-502 through 8-516 can access and write to various PFS devices such as PFS 8-602 through PFS 8-616. They are all connected via an internal backbone of various joined segments 8-P502 through 8-P516.

As an example, it shows how the Slinghop can integrate with a GVN and some of its devices such as an access point server (SRV_AP) 8-302, an end-point device (EPD) 100, and a central control server (SRV_CNTRL) 200. The circles with an E represent an egress-ingress point (EIP) to an EPD. SRV_BBX/SLN 8-502 can link to SRV_AP 8-302 via 8-P302. SRV_AP can link to E via 8-P102 and link to C via 8-P202. The circles with a C represent an EIP to an SRV_CNTRL. Similar configurations can be available for other access point servers SRV_AP 8-304 through 8-316, other backbone exchange servers and sling nodes SRV_BBX/SLN 8-504 through 8-516, and other paths or links 8-P102 through 8-P116, 8-P202 through 8-P216.

The octagonal shape is not of material significance and is presented for illustrative purposes only. The actual shape may or may not be in a ring shape, or will take on other shape(s).

Figure 9:
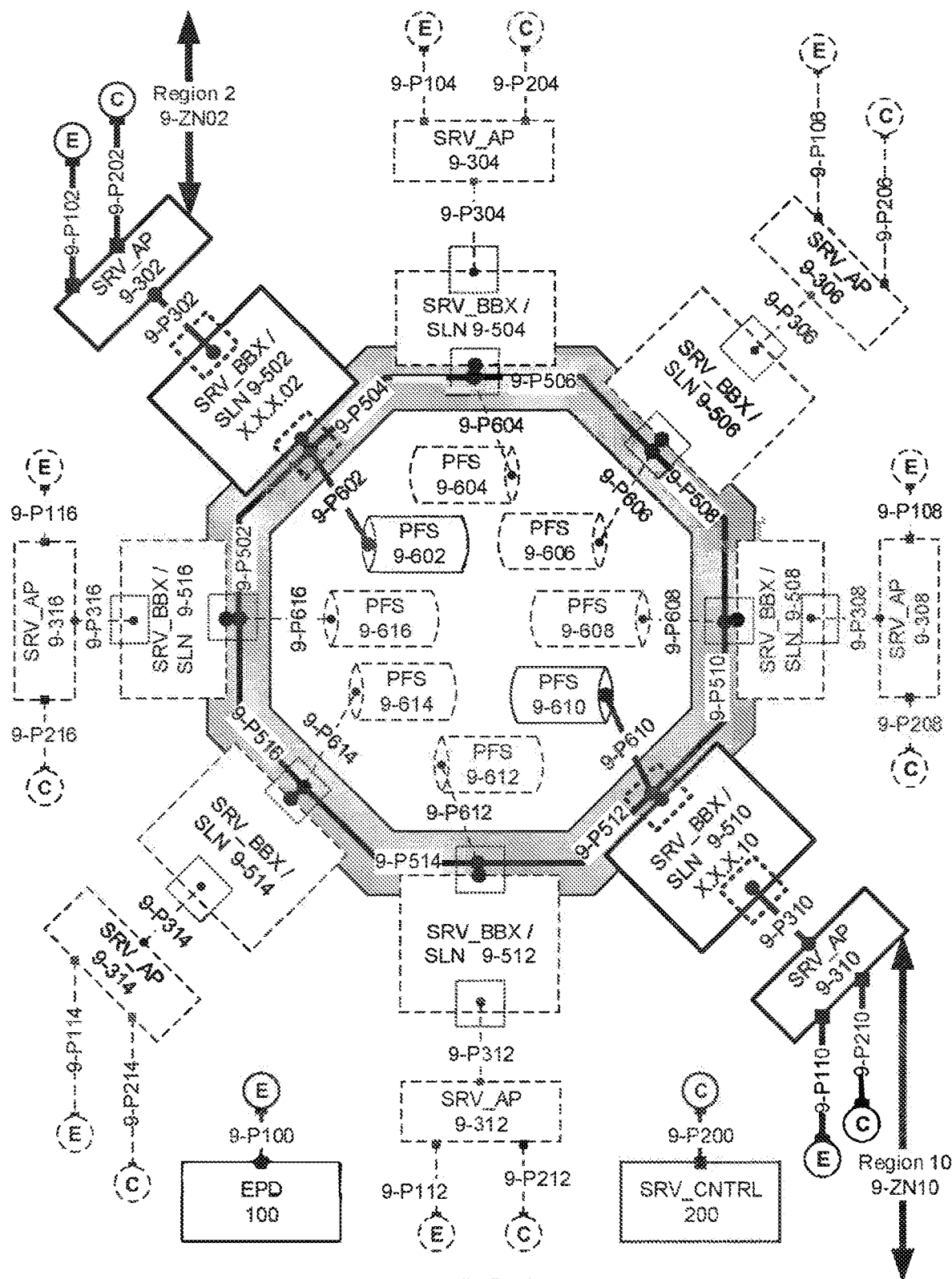
FIG. 9 illustrates Sling-Routing with targeted write to PFS to route traffic.

FIG. 9 illustrates Sling-Routing with Targeted Write to PFS to route traffic. Reference numerals in FIG. 8 that start with "8-" are numbered the same way in FIG. 9 for similar or same elements, except that "8-" has been replaced with "9-" in FIG. 9. FIG. 9 is based on FIG. 8 with some exceptions. Differences between these example embodiments are that most of the bridgehead node points are faded. This is to highlight interaction between two bridgehead node points denoting Slinghop connectivity from Region 2 9-ZN02 to Region 10 9-ZN10 via SRV_BBX/SLN 9-502 to write via RDMA directly to PFS 9-610 with SLN/SRV_BBX 9-510 reading the carrier file and using it in Region 10 9-ZN10. Reciprocal traffic in the other direction from Region 10 9-ZN10 to Region 2 9-ZN02 is written via RDMA by SRV_BBX/SLN 9-510 to PFS 9-602. The carrier file is read by SRV_BBX/SLN 9-502 to be used there. These bridgeheads are bolded to highlight their place and focus. IP addresses are noted for illustrative purposes X.X.X.02 at 9-502 and X.X.X.10 at 9-510 as either end. Slinghop is therefore from Region 2 9-ZN02 to Region 10 9-ZN10 by IP order of X.X.X.02 to X.X.X.10, and back from Region 10 9-ZN10 to Region 2 9-ZN02 via IP order of X.X.X.10 to X.X.X.02.

In practical use, all connected nodes can concurrently connect with PFS devices in all other regions and locations. This figure focuses on the example embodiment of one two-way Slingroute.

Figure 10:
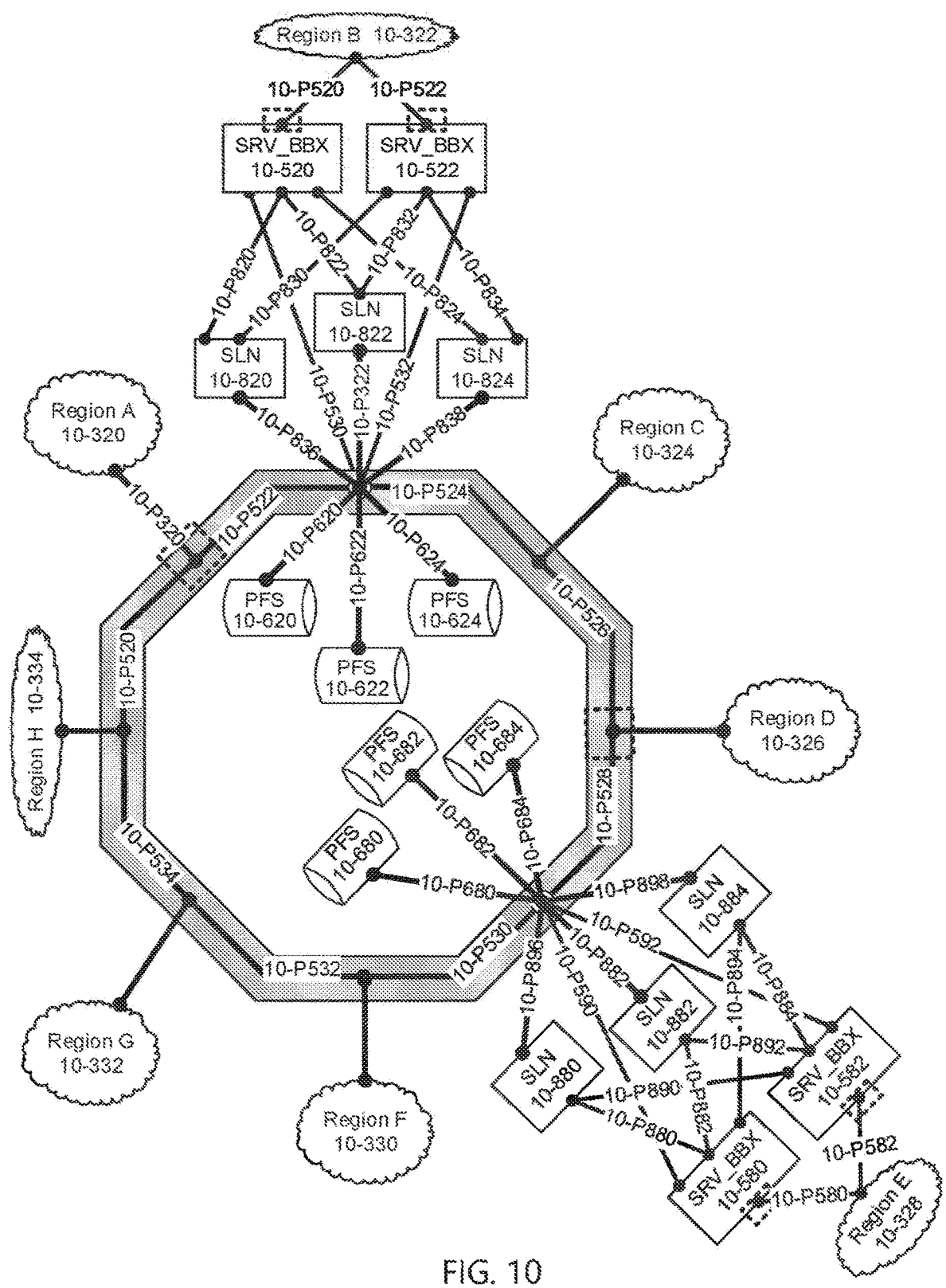
FIG. 10 illustrates Ring of PFS devices with multiple SLN per location.

FIG. 10 illustrates Ring of PFS devices with multiple SLN per location. This example embodiment is a continuation of FIG. 9 and it describes the flow between a backbone exchange server (SRV_BBX) such as 10-520, 10-522 in Region B 10-322 or 10-580, 10-582 in Region E 10-328, sling nodes (SLN) 10-820, 10-822, 10-824 in Region B 10-322 or 10-880, 10-882, 10-884 in Region E 10-328, and the physical ring linking regions to each other via InfiniBand or equivalent or other fast backbone communication protocol via ring 10-P520 through 10-P534. Parallel file system devices (PFS) where remote RDMA file writes are committed are also accessible via the global communications ring or another shaped topology.

The key example embodiments illustrated herein are that in each region there are multiple SRV_BBX, SLN, and PFS devices. In each region, two or more SRV_BBX servers offer high availability and failover. Flexible topology by device role also allows for rapid rollout and scalability. Each SRV_BBX can access one or more SLN, and each SLN is connected to all PFS devices (e.g., PFS 10-620, 10-622, 10-624, 10-680, 10-682, 10-684) in that region as well as other regions. FIG. 10 shows other regions including Region A 10-320, Region C 10-324, Region D 10-326, Region F 10-330, Region G 10-332, and Region H 10-334. Paths or links between a region and a SRV_BBX are shown using 10-P520, 10-P522, 10-P580, and 10-P582. Paths or links between an SRV_BBX and an SLN are shown using 10-P820, 10-P822, 10-P824, 10-P830, 10-P832, 10-P834, 10-P880, 10-P882, 10-P884, 10-P890, 10-P892, and 10-P894. Paths or links between an SRV_BBX and the ring are shown using 10-P530, 10-P532, 10-P590, and 10-P592. Paths or links between an SLN and the ring are shown using 10-P836, 10-P322, 10-P838, 10-P896, 10-P882, and 10-P898. Paths or links between the ring and a PFS are shown using 10-P620, 10-P622, 10-P624, 10-P680, 10-P682, and 10-P684. A path or link between Region A 10-320 and the ring is shown as 10-P320.

This construct is designed with failover and high availability in mind as well as offering multiple Slingroute options for traffic to take. PFS and SLN devices are reliable through high availability.

Figure 11:
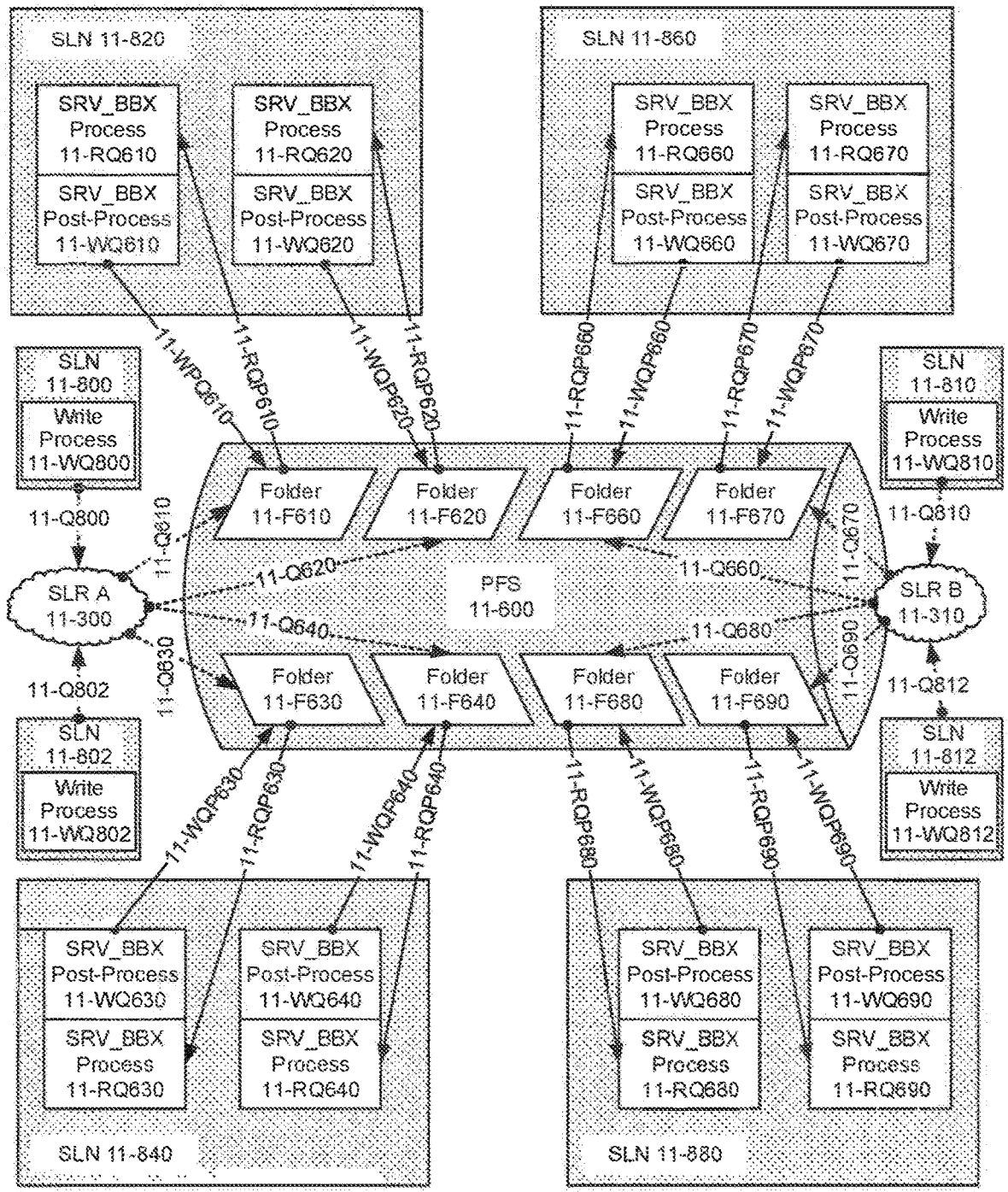
FIG. 11 illustrates multi-folder access by multiple sling nodes.

FIG. 11 illustrates multi-folder access by multiple sling nodes (SLN). This example embodiment describes how multiple sling nodes (SLN) can access different folders on the PFS 11-600. It illustrates SLN 11-800 and 11-802 in Region A SLR-A 11-300 being able to write directly to PFS 11-600 in another region, Region C. There are also SLN 11-810 and 11-812 in Region B 11-310 which can also write to PFS 11-600 in Region C. In Region C, there are also SLN 11-820, 11-840, 11-860, and 11-880 which monitor and can read and otherwise manage files which arrive there.

One example configuration is that each SLN in the target Region C can be assigned certain folders on PFS 11-600. For example, Folder 11-F610 is managed by the read queue process of 11-RQ610 and once files have been read and used, the Post-Process 11-WQ610 can mark those files in folder 11-F610 as read. Similarly, read queue Process 11-RQ620 and Post-Process 11-WQ620 focus on folder 11-F620. This is to permit different priority and handling for contents of each folder. For example, folder 11-F610 might be set with a very short time interval between batch processing of received files to offer very high performance and the shortest possible processing time for files through the slingshot mechanism. Data written to folder 11-F620 is accessed at a longer time interval between batch processing of received files and therefore has a different quality of service (QOS) specification. So Slingrouting can differentiate and choose desired QoS based on the folder written to with the origin SLN such as 11-800 knowing that the target SLN 11-820 will process folders at various QoS rates.

Another example embodiment illustrated herein is for different sling nodes (SLN) to be able to access other folders on the same PFS 11-600. This can be for load balancing, QoS reasons, high availability, different purpose of utilization, or other reasons.

Another example embodiment illustrated herein is that traffic from other regions is written to other folders such as SLN 11-812 writing to Folder 11-680 which is accessed by SLN 11-880's read queue Process 11-RQ680 and read files marked by Post-Process 11-WQ680. Folders can be labeled with a "from HERE" or "from THERE" label to note other otherwise classify source of sling traffic.

Other folders, including folders 11-F660 through 11-F690 can be configured similar to, or different from folder 11-F610 or 11-F620. These other folders can also include SRV_BBX Processes (e.g., 11-RQ630, 11-RQ640, 11-RQ660, 11-RQ670, 11-RQ680, 11-RQ690) and SRV_BBX Post-Processes (e.g., 11-WQ630, 11-WQ640, 11-WQ660, 11-WQ670, 11-WQ680, 11-WQ690). Paths between PFS 11-600 and various SRV_BBX Processes can include 11-RQP630, 11-RQP640, 11-RQP660, 11-RQP670, 11-RQP680, and 11-RQP690. Paths between PFS 11-600 and various SRV_BBX Post-Processes can include 11-WQP630, 11-WQP640, 11-WQP660, 11-WQP670, 11-WQP680, and 11-WQP690.

SLN 11-800 can include write process 11-WQ800. SLN 11-800 can link to SLR A 11-300 via 11-Q800. SLN 11-802 can include write process 11-WQ802. SLN 11-802 can link to SLR A 11-300 via 11-Q802. SLN 11-810 can include write process 11-WQ810. SLN 11-810 can link to SLR B 11-310 via 11-Q810. SLN 11-812 can include write process 11-WQ812. SLN 11-812 can link to SLR B 11-310 via 11-Q812. SLR A 11-300 can link to various folders via 11-Q610 through 11-Q640. SLR B 11-310 can link to various folders via 11-Q660 through 11-Q690.

The specific number of folders and corresponding read queues Processes and Post-Process managers will vary in real-world deployment. SLN managers can dynamically add, modify, or otherwise manage the folders and their QoS rating. Each SLN can also write to and read from multiple PFS devices.

Figure 12:
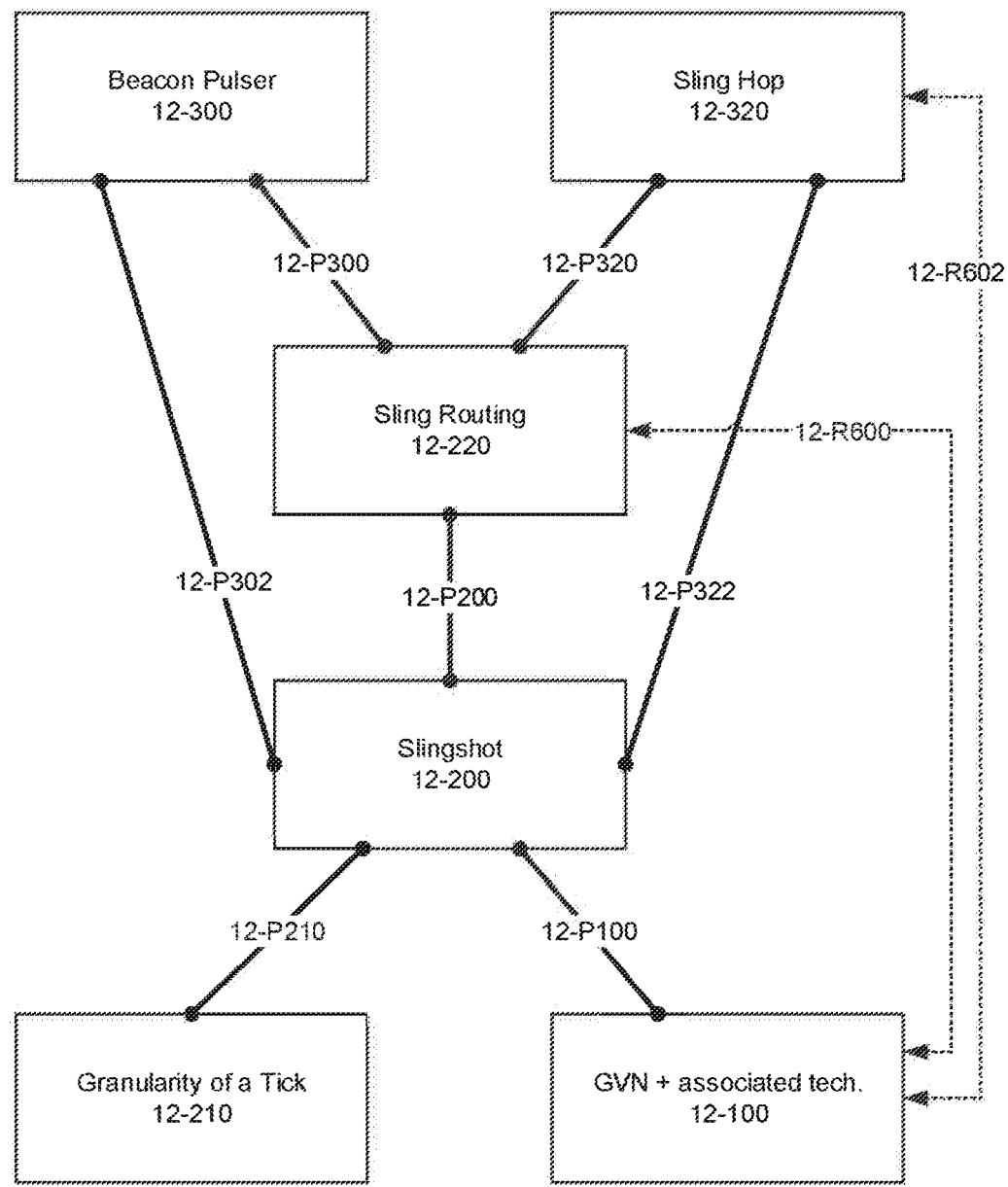
FIG. 12 illustrates Sling modules for integration and collaboration.

FIG. 12 illustrates various Sling Modules for integration and collaboration. This example embodiment describes the relationships between slingshot 12-200 and its technologies which it utilizes or otherwise interacts with such as granularity of a tick 12-210 and a global virtual network (GVN) and its associated technologies 12-100. Granularity of a tick 12-210 and Slingshot 12-200 govern the QoS and timing of sling transfers. Sling routing 12-220 is at the core and is built upon slingshot 12-200. It also serves as a basis of sling hop 12-320 and beacon pulser 12-300.

This figure also maps the interrelationships between them by using various paths or links, including 12-P302, 12-P210, 12-P200, 12-P300, 12-P100, 12-P320, 12-P322, 12-R600, and 12-R602.

Figure 13:
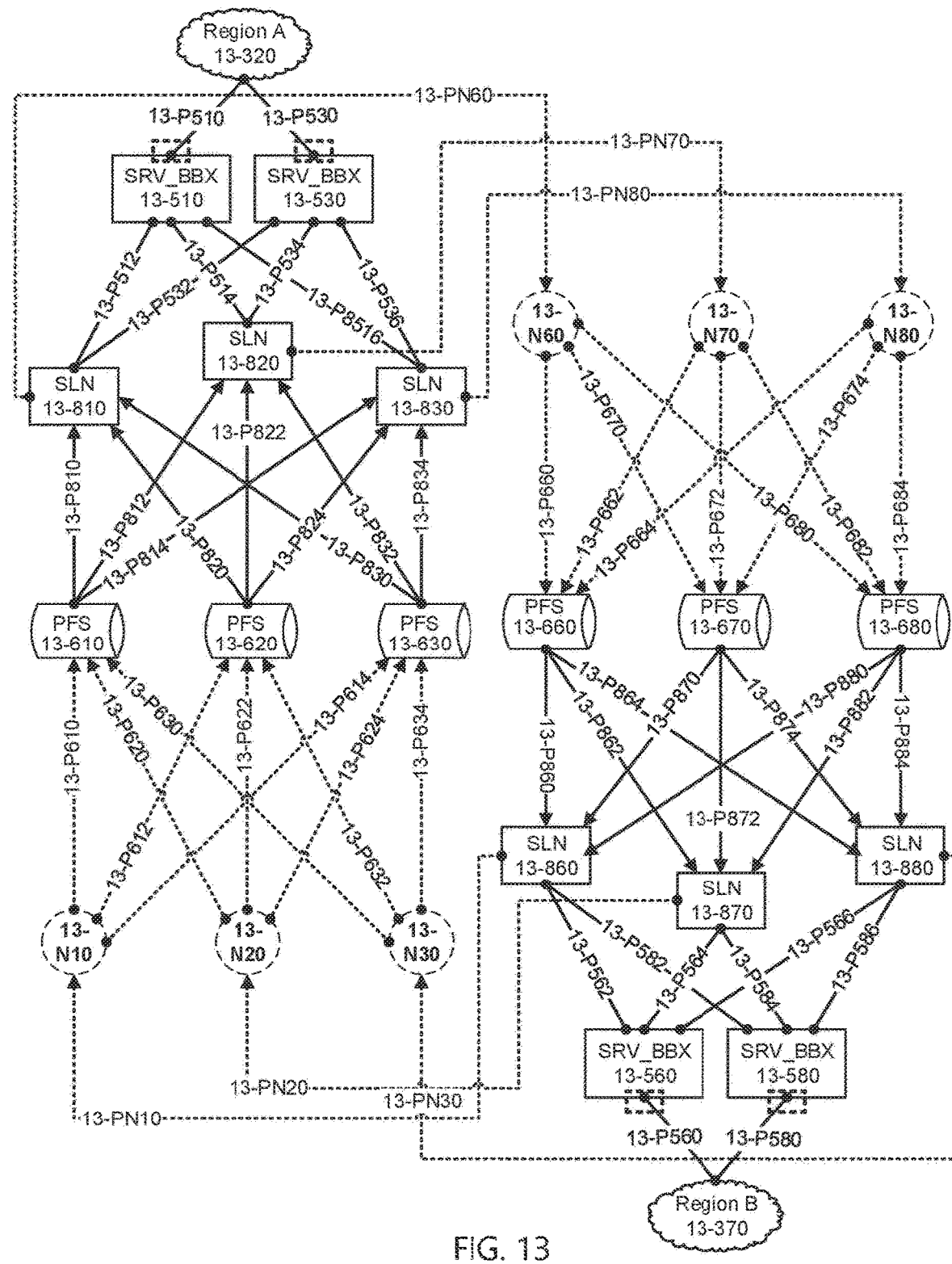
FIG. 13 illustrates SRV_BBX topology with options to multiple sling nodes (SLN) and associated PFSs.

FIG. 13 illustrates SRV_BBX topology with options to multiple sling nodes (SLN) and associated PFS devices. This example embodiment describes the relationship between backbone exchange servers (SRV_BBX) and sling nodes (SLN) and parallel file systems (PFS) devices and their interrelationships, illustrating elements for high availability, load balancing and failover.

This figure describes the Slingroute options between Region A 13-320 and Region B 13-370. It further illustrates two SRV_BBX 13-510 and 13-530 in Region A 13-320 and two SRV_BBX 13-560 and 13-580 in Region B 13-370. Each SRV_BBX can read from one or more SLN 13-810, 13-820, and 13-830 in its region. In this example, three SLN devices are illustrated but the number of SLN, SRV_BBX, and PFS devices in use will vary based on demand, capacity to meet that demand, failover, and other considerations.

Each SLN 13-810, 13-820, and 13-830 in Region A 13-320 can write to PFS devices 13-660, 13-670, and/or 13-680 in Region B 13-370 for reading by SLN 13-860, 13-870, and/or 13-880 via paths 13-PN60, 13-PN70, and 13-PN80. Similarly, an SLN in Region B can write to PFS devices 13-610, 13-620, and/or 13-630 in Region A 13-320. Junction points in this diagram 13-N10, 13-N20, 13-N30, 13-N60, 13-N70, and 13-N80 are for illustrative purposes. They do not necessarily represent a specific device but could be a switch or other aspect of network path for sling traffic to be sling-routed via.

Paths or links between various elements of FIG. 13 include: 13-P510, 13-P530, 13-P512, 13-P532, 13-P514, 13-P534, 13-P8516, 13-P536, 13-P810, 13-P812, 13-P814, 13-P820, 13-P822, 13-P824, 13-P830, 13-P832, 13-P834, 13-P610, 13-P620, 13-P630, 13-P622, 13-P614, 13-P624, 13-P634, 13-P612, 13-P632, 13-PN10, 13-PN20, 13-PN30, 13-P660, 13-P670, 13-P674, 13-P660, 13-P662, 13-P664, 13-P672, 13-P680, 13-P682, 13-P684, 13-P680, 13-P862, 13-P864, 13-P870, 13-P872, 13-P874, 13-P880, 13-P882, 13-P884, 13-P562, 13-P582, 13-P564, 13-P584, 13-P566, 13-P586, 13-P560, and 13-P580.

This figure is to illustrate the flexibility of Slingrouting highlighting its various aspects.

Figure 14:
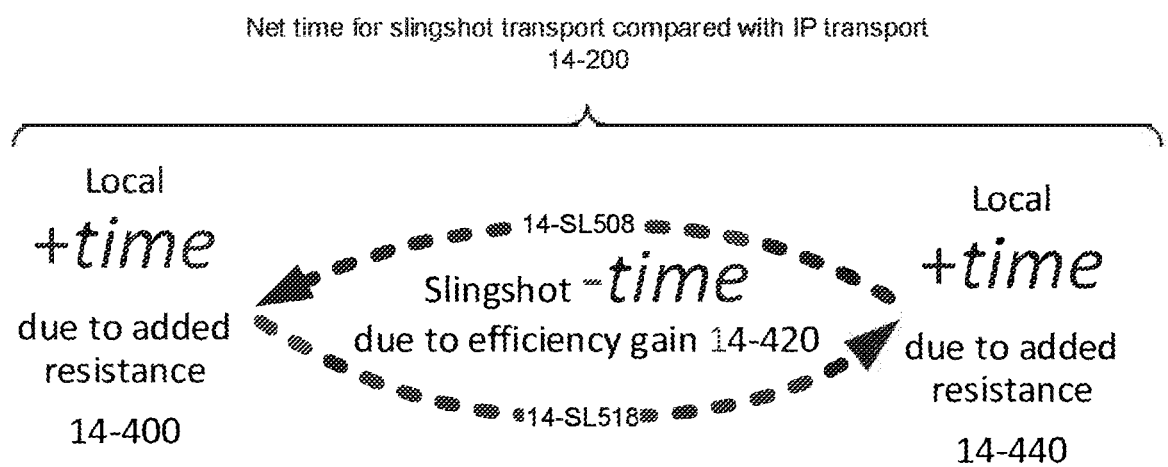
FIG. 14 illustrates algorithm logic for evaluating best route type for traffic to take.

FIG. 14 illustrates algorithm logic for evaluating best route type for traffic to take. Both ends of a slingshot mechanism add a certain amount of resistance in the form of needing computing resources such as processing, RAM, or other which injects a certain amount of time delay into a network path. This resistance and added time is illustrated by 14-400 and 14-440. However, slingshot's efficiency over a long distance reduces the data transit time each way by a certain amount when compared to other long-haul network protocol transit such as comparing Slingshot to IP over Ethernet on the Internet. Therefore, a comparison 14-200 can be made end-to-end to evaluate if the gain over the long haul 14-420 using slingshot can offset the delay due to resistance at 14-400 and 14-440. When the distance is great enough that the gain in 14-420 is more than the friction delay caused by 14-400 and 14-440, then Slingshot and sling-routed traffic is the most optimal path for traffic to take. This figure can be a basis for evaluation of best traffic path in FIG. 15. For example, 14-400 can describe the steps SRV_AP 15-200 to SRV_BBX 15-500 to SLN 15-508, and 14-440 can describe the steps SRV_AP 15-202 to SRV_BBX 15-510 to SLN 15-518.

The slingshot one way traffic 14-SL508 can describe the RDMA write 15-WQ502 via path 15-W606 to PFS 15-606 to be read by SLN 15-518 Read Queue 15-RQ506 via path 15-R606. Slingshot one-way traffic 14-SL518 can describe the RDMA write 15-WQ506 via path W602 to PFS 602 to be read by SLN 15-508 Read Queue 15-RQ502 via path 15-R602.

Figure 15:
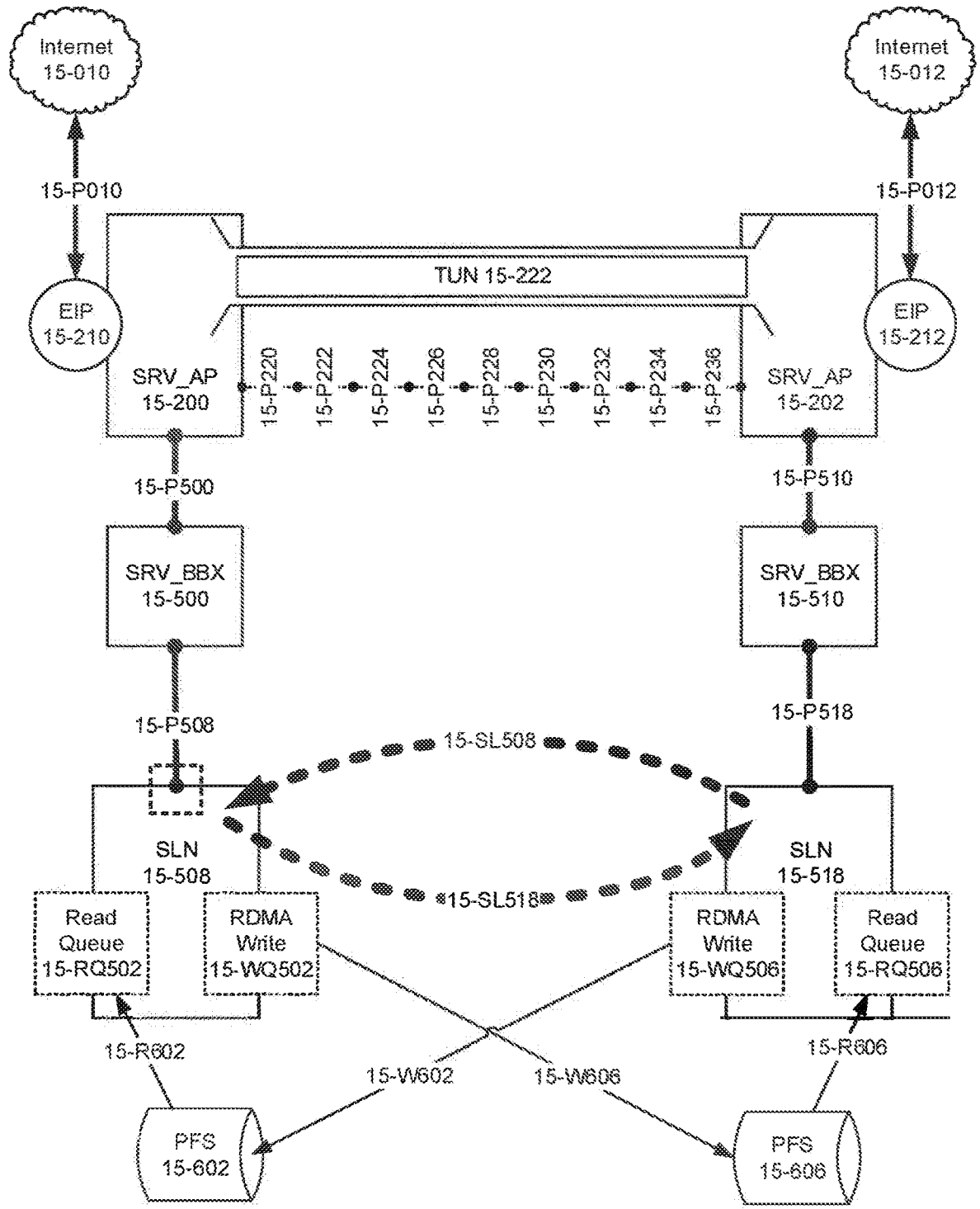
FIG. 15 illustrates Slingshot/Slinghop as UTI alternative to either internet path or TUN OTT internet.

FIG. 15 illustrates Slingshot/Slinghop as UTI alternative to either internet path 15-P220 to 15-P236 or TUN OTT 15-222 internet. This figure compares three traffic path types: one over the open internet via path 15-P220 to 15-P236, a second via a tunnel TUN 15-222, and a third via a reciprocal Slinghop 15-SL518 and back via 15-SL508. The tunnel TUN 15-222 is over-the-top (OTT) of the internet, and Slinghop utilizes reciprocal Slingshot mechanisms over fiber back bone or equivalent high speed network which can support slingshot.

Algorithmic analysis can be applied to choose which transport type over which path is most optimal for the traffic to take considering latency, bandwidth, and other factors effecting overall efficiency for complete transfer of data from one region 15-010 to another 15-012. The label Internet is applied at 15-010 and 15-012 for example only, as these end points via egress-ingress points 15-210 and 15-212 can link to intranets, LANs, and various other network fabrics. Paths or links between various elements can include 15-P010, 15-P012, 15-P500, 15-P510, 15-P508, 15-P518.

The lower portion of this figure (below SRV_BBX 15-500 and SRV_BBX 15-510) operates in the same manner as the slingshot mechanism described in FIG. 6 herein. As components of a global virtual network (GVN), these path choices can be evaluated based on current network conditions, data type, QoS requirements, load, and other factors.

Figure 16:
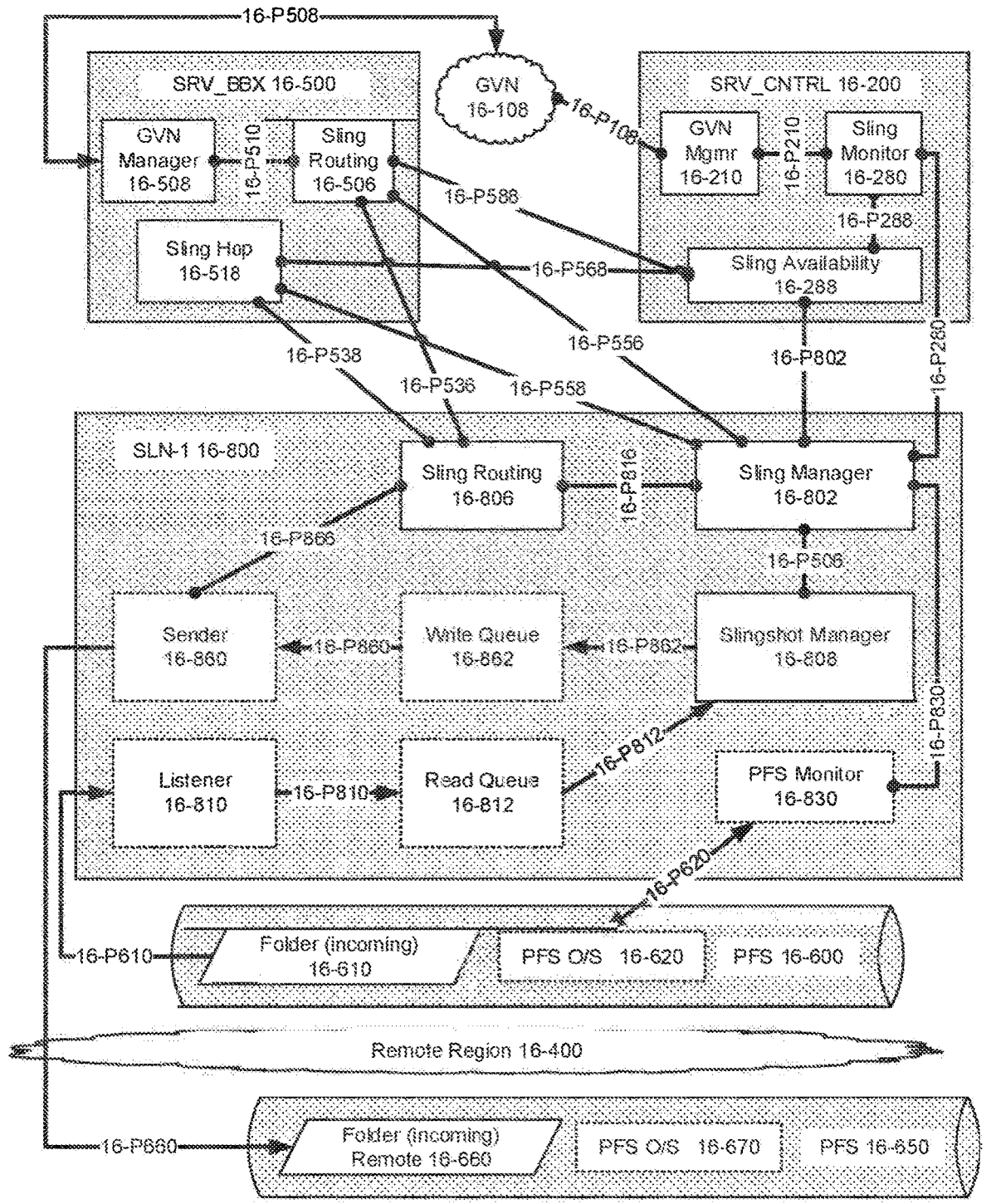
FIG. 16 illustrates Slingshot Manager and modules collaborating across various devices.

FIG. 16 illustrates Slingshot Manager and modules collaborating across various devices. This figure describes the collaboration between devices such as back bone exchange server (SRV_BBX) 16-500, central control server (SRV_CNTRL) 16-200, sling nodes (SLN) 16-800, and parallel file systems (PFS) 16-600, 16-650. Slingrouting offers dynamic, real-time routing options for slingshot traffic to take based on target region, QoS, long-haul line state, and other factors.

To achieve optimal performance in real-time, devices need to share information about their operations including load factors, health, and other data. Sling Manager 16-802 on the SLN-1 16-800 determines which sling route to take. Sling Manager 16-802 interacts with Sling Routing 16-806 governing which PFS the Sender 16-860 writes to, and the QoS for that transfer determining which folder to write the file to. In this example embodiment, Sling Manager 16-802 uses Sender 16-860 to write the file by slingshot to the folder 16-660 on PFS 16-650 in remote region 16-400 via path 16-P660.

The listener 16-810 on SLN-1 16-800 reads files in the incoming folder 16-610 on PFS 16-600 in the local region for processing by Read Queue 16-812. Slingshot manager 16-808 controls the operations of Write 16-862 and Read 16-812, as well as receiving performance related data about their operations. The sling manager local analyzes sling related operations, coordinates with Sling Routing 16-806. It also shares information with Sling Routing module 16-506 on SRV_BBX 16-500 and with the module Server Availability 16-288 on SRV_CNTRL 16-200, as well as with Sling Monitor 16-280 on SRV_CNTRL 16-200.

Information from various devices and modules are received by SRV_CNTRL 16-200and analyzed to determine current Sling Availability 16-288. This availability is then shared contextually with devices with respect to sling availability for them. This forms the basis of the list generation of sling routing options available to senders such as 16-860 generated by Sling Routing 16-806. Sling Routing 16-806 can further provide determinate estimates of time-to-transfer based on current and historical conditions.

There are other possible collaborative activities between devices and other modules which those described may collaborate with. In addition, the Read Queue 16-862 and Write Queue 16-812 may be bypassed, and other elements described herein may be altered but Slingroute will still function.

The GVN Manager 16-508 manages the operations and information about operation of related devices in the GVN, including central control servers (SRV_CNTRL), backbone exchange servers (SRV_BBX), sling nodes (SLN), parallel file system storage devices (PFS), access point servers (SRV_AP), end point devices (EPD) and other devices of the GVN.

Sling Hop 16-518 is the integration of slingshot into an internet pathway. One IP at one end is the ingress egress points (EIP) and the IP at the other end is the EIP. These two EIPs powered by reciprocal slingshots constitute a Slinghop.

The GVN manager 16-210 on the SRV_CNTRL manages the repository of information for various GVN devices, as well as managing the peer pair relationships for neutral API mechanism (NAPIM), and other tasks. It also executes algorithms on logged data to analyze current operations, short, medium, and long term operations to identify trends as well as to take a predictive role in managing systems operations.

GVN 16-108 represents the global virtual network (GVN) which the Slingroute may integrate into. GVN 16-108 can also be internet or other network type such as a private WAN, etc.

PFS Monitor 16-830 on SLN devices such as SLN-1 16-800 reacts with the operating systems of the PFS devices to gather information on the storage state, resources consumption, and other pertinent information about the PFS. This operational information is shared with Sling Manager 16-802 by PFS Monitor 16-830 in order to then provide a summary of information to the Sling Availability module 16-288 on SRV_CNTRL 16-200.

The modules PFS O/S 16-620 and PFS O/S 16-670 on PFS 16-600 and PFS-650 respectively are the operating system of the PFS devices. These are the underlying controllers which handle the physical subsystems for device management, as well as to combine and make information available about their operations to other devices.

Paths or links between various elements of FIG. 16 include 16-P508, 16-P10, 16-P538, 16-P588, 16-P568, 16-P108, 16-P210, 16-P288, 16-P536, 16-P558, 16-P556, 16-P802, 16-P280, 16-P866, 16-P816, 16-P860, 16-P862, 16-P830, 16-P810, 16-P812, 16-P610, and 16-P620.

Figure 17:
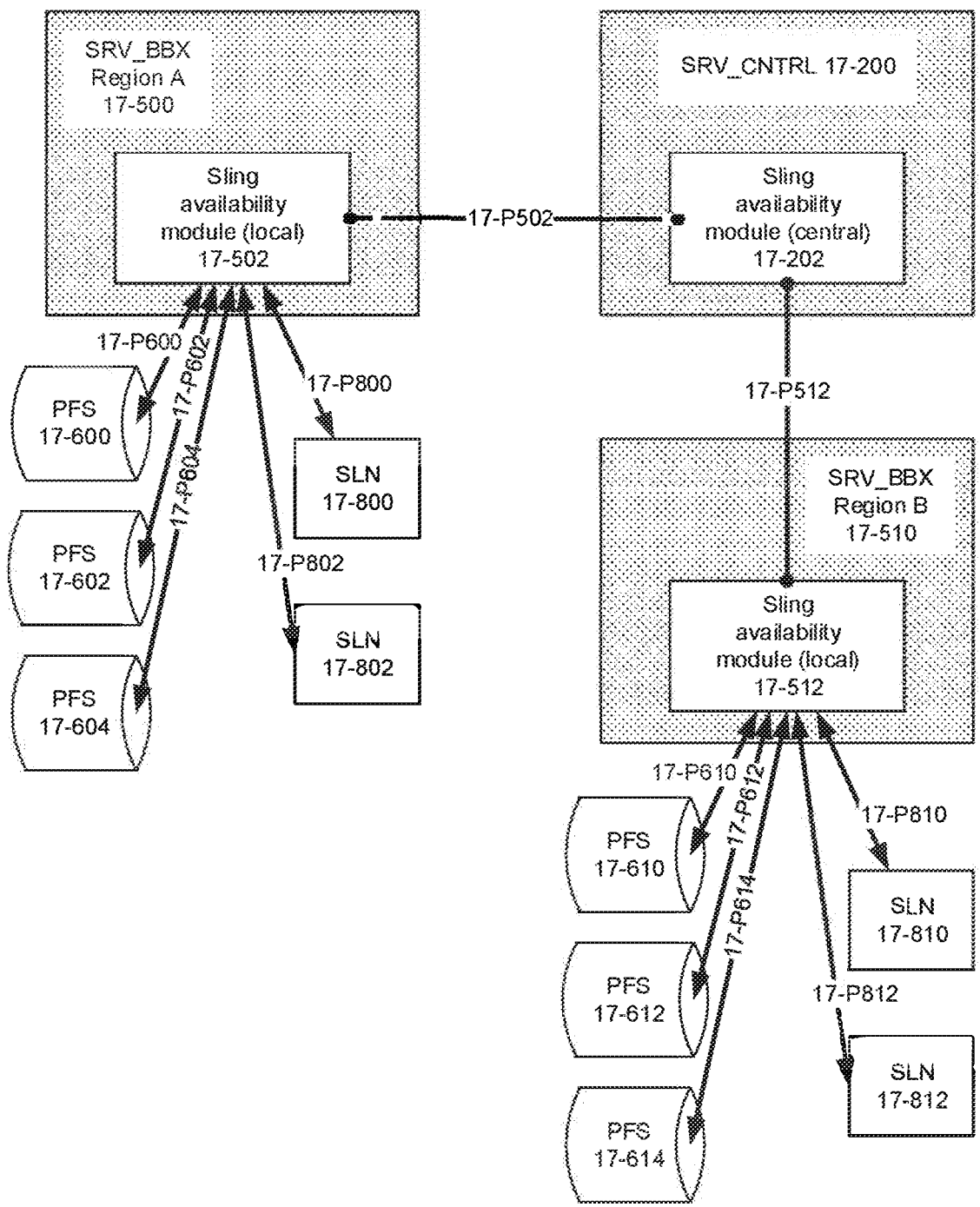
FIG. 17 illustrates Sling Route, where Availability Modules collaborate across various devices.

FIG. 17 illustrates Sling Route with Availability Modules collaborating across various devices. This figure refers to sling route availability module in accordance with certain embodiments of the disclosed subject matter. The device types described herein are backbone exchange server (SRV_BBX) 17-500 and 17-510, central control server (SRV_CNTRL) 17-200, parallel file system storage (PFS) 17-600, 17-602, 17-604, 17-610, 17-612, 17-614, and sling nodes (SLN) 17-800, 17-802, 17-810, 17-812.

This figure graphically demonstrates the list of PFS and SLN devices available to SRV_BBX and SLN devices in each region. The SRV_BBX can act as an aggregation point for information about Slinghops which can then be utilized for Slingrouting. The Sling availability module (central) 17-202 on SRV_CNTRL 17-200 receives and processes information from all devices and publishes availability information to Sling availability modules (local) 17-502 and 17-512. Other elements on an SRV_BBX not described herein may include local database, storage, control node governing PFS and SLN devices in its region, and more.

Both current and historical information is evaluated to understand current availability. Trend analysis is both valuable for resource planning as well as predictive applications.

When a device fails or its state is changed for instance so that it can undergo maintenance, this information is shared, processed: its availability state is marked as not available; and it is subsequently removed from the availability list.

Types of information shared from PFS to SRV_BBX could include state of device, storage levels, usage, problems or other health issues, etc. From the SRV_BBX to the PFS, instructions could be given to purge old files, to perform updates or other maintenance, resolve health issues, to create new or modify existing folder structure, and more. From SLN to SRV_BBX information could be shared such as device state, usage, traffic levels, problems or heath issues, and more. From the SRV_BBX to SLN the current PFS device availability list, state of cross-regional links, software updates, resolve issue, adjust queue priority levels, publish sling routes and sling availability information, and more. One SRV_BBX is in Region A 17-500, and the other SRV_BBX is in Region B 17-512. The central server can be somewhere in the middle or in another location but it must be reachable by both devices. This figure is focused on server availability module information sharing.

The analysis on SRV_CNTRL 17-200 does holistic system-wide global analysis as well as drill-down granular device or group of device analysis. Traffic analysis is done to anticipate expected load factors and to meet this with sufficient resources, making real time adjustments and that information automatically propagating to related devices.

Paths or links between various elements of FIG. 17 include 17-P600, 17-P602, 17-P604, 17-P800, 17-P802, 17-P502, 17-P512, 17-P610, 17-P612, 17-P614, 17-P810, and 17-P812.

Figure 18:
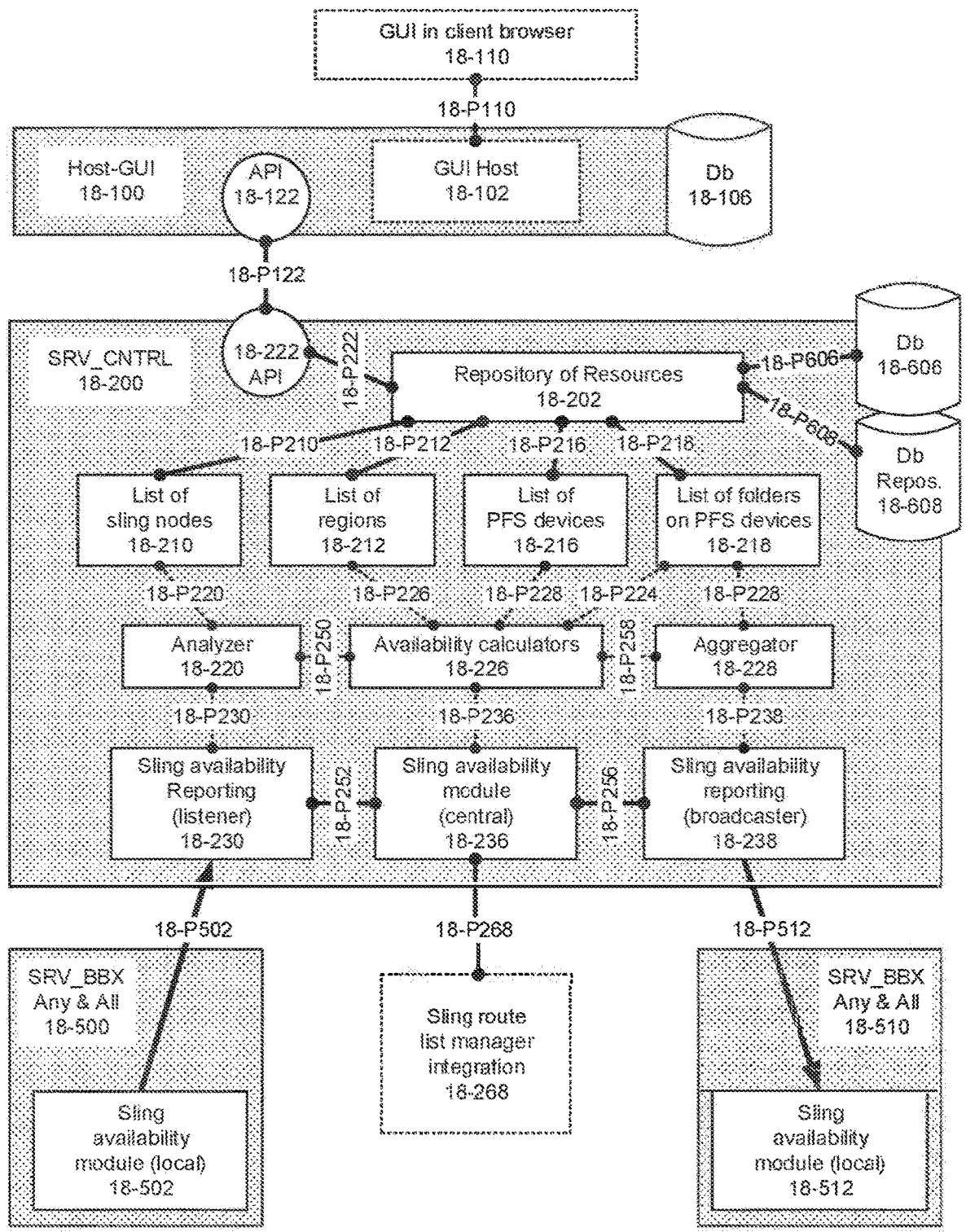
FIG. 18 illustrates Sling Route, where Availability Reporting module collaborates across various devices.

FIG. 18 illustrates Slingroute with Availability Reporting module collaborating across various devices. This figure refers to Slingroute availability reporting in accordance with certain embodiments of the disclosed subject matter. It focuses on various modules and component parts of the sling availability mechanism with specific focus on SRV_CNTRL 18-200 expanding upon SRV_CNTRL 17-200. The devices described herein are central control server (SRV_CNTRL), backbone exchange server (SRV_BBX), and a host for a graphic user interface (Host-GUI) 18-100, as well as an inference to a browser rendering the GUI content on a client device 18-110. FIG. 18 is a more detailed expansion of FIG. 17.

FIG. 18 describes information stored in databases such as Db 18-606 storing information about this specific device and its operations, and Db Repos. 18-608 which stores information about resources in list form such as list of sling nodes 18-210, list of regions 18-212, list of PFS devices 18-216, list of folders on PFS device 18-218, and other information.

The sling availability reporting module has a listener 18-230 which receives information from SRV_BBX devices such as 18-500 from its local sling availability module 18-502. This information is shared with the sling availability module 18-236 on SRV_CNTRL 18-200. It is also analyzed by Analyzer 18-220. Data from various device data feeds via 18-P502 as well as data from the repository database 18-608 are compared and analyzed by availability calculators 18-226. The data aggregator 18-228 takes results and broadcasts them via Sling availability reporting broadcaster 18-238 to various SRV_BBX such as 18-510 via path 18-P512 for use by the local sling availability module 18-512 there.

Slingroute list manager integration 18-268 describes the possibility for this list to be utilized by related devices, such as sling nodes (SLN), or others.

Paths or links between various elements of FIG. 18 include 18-P110, 18-P122, 18-P222, 18-P606, 18-P608, 18-P210, 18-P212, 18-P216, 18-P218, 18-P220, 18-P226, 18-P228, 18-P224, 18-230, 18-P250, 18-P258, 18-P230, 18-P236, 18-P238, 18-P252, 18-P256, and 18-P268.

The modules API 18-122 and API 18-222 refer to the neutral application programming interface module (NAPIM) for communication between the central control server (SRV_CNTRL 18-200) and the host device where the GUI is running 18-100. GUI Host 18-102 is a device such as a laptop computer, mobile phone, tablet, or other device which can connect to the GUI host device 18-100 to receive GUI content and render it into a browser on the client. Db 18-106 is the database which stores data relevant to device SRV_CNTRL 18-200. The repository database 18-608 stores information about various devices which either send information to or receive information from SRV_CNTRL 18-200. Repository of Resources 18-202 manages the various lists of SLN sling nodes 18-210, of various regions where infrastructure is located 18-212, of various storage devices in those regions 18-216, as well as a list of target folders and their types on various PFS devices 18-218, and other information.

Figure 19:
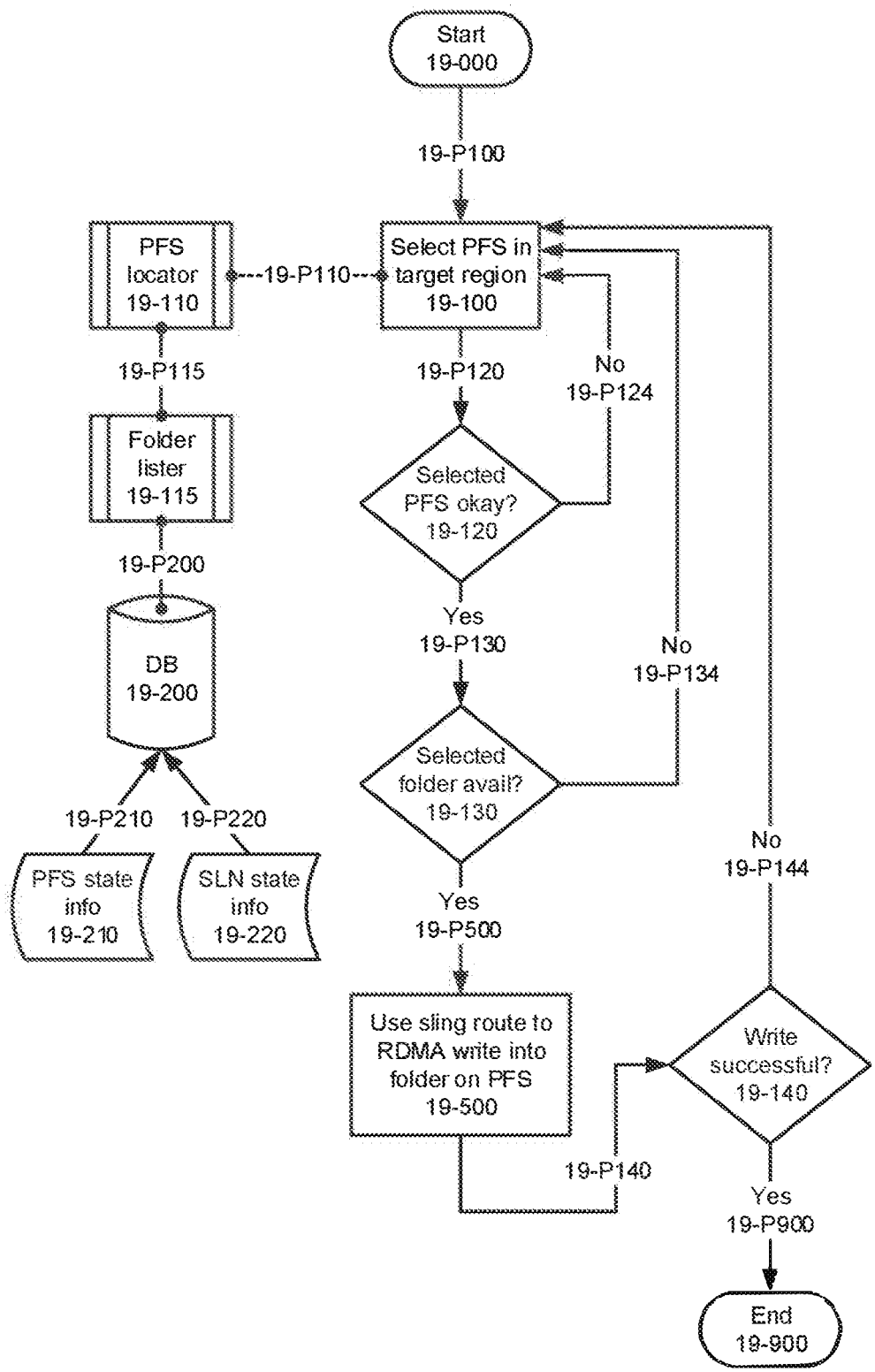
FIG. 19 illustrates Sling Route with algorithm to assess sling availability per state and utilization rate.

FIG. 19 illustrates Sling Route with an algorithm to assess sling availability per state and utilization rate. This figure refers to an algorithm to assess sling route availability per state and utilization rate in accordance with certain embodiments of the disclosed subject matter. It begins at Start 19-000.

The availability of PFS devices, sling nodes and other information is received via the storing of PFS state info 19-210 and SLN state info 19-220 into database DB 19-200. Using PFS location 19-110 and Folder lister 19-115, folder and location information is pulled from DB 19-200 and made available to PFS selector 19-100 via path 19-P110. The rationale is that the SLN state info 19-220 is required so that not only is desired PFS 19-210 known and selected 19-100, but that there are sufficient corresponding SLN devices to manage the read.

Once the PFS in target region is selected at 19-100, its state and health is checked at 19-120 against the most current database entry generating list from 19-110. If it is okay 19-P130, the generated folder list from 19-115 is further checked to see if the target folder at desired QoS is available (19-130). If it is available (19-P500), then the direct write is executed to target folder on remote PFS 19-500. The sling write is checked at step 19-140 and if successful 19-P900, this ends a successful sling write 19-900.

If there is a problem with target PFS 19-P124, then an alternative PFS is chosen at step 19-100 to be evaluated. If an PFS is okay (19-P130) but the target folder is unavailable, an alternative PFS and folder is chosen 19-100 via path 19-P134.

A key point is that the current state of each device is automatically published to other devices so that the target selection is dynamic and in real time based on known information. If there is a lag during the write due to a changing condition, the unsuccessful write is caught at step 19-140 and via 19-P144, an alternate PFS and target folder can be selected 19-100 for another try at a write.

Paths or links between various elements of FIG. 19 include 19-P115, 19-P200, 19-P210, 19-P220, 19-P100, 19-P120, and 19-P140.

Figure 20:
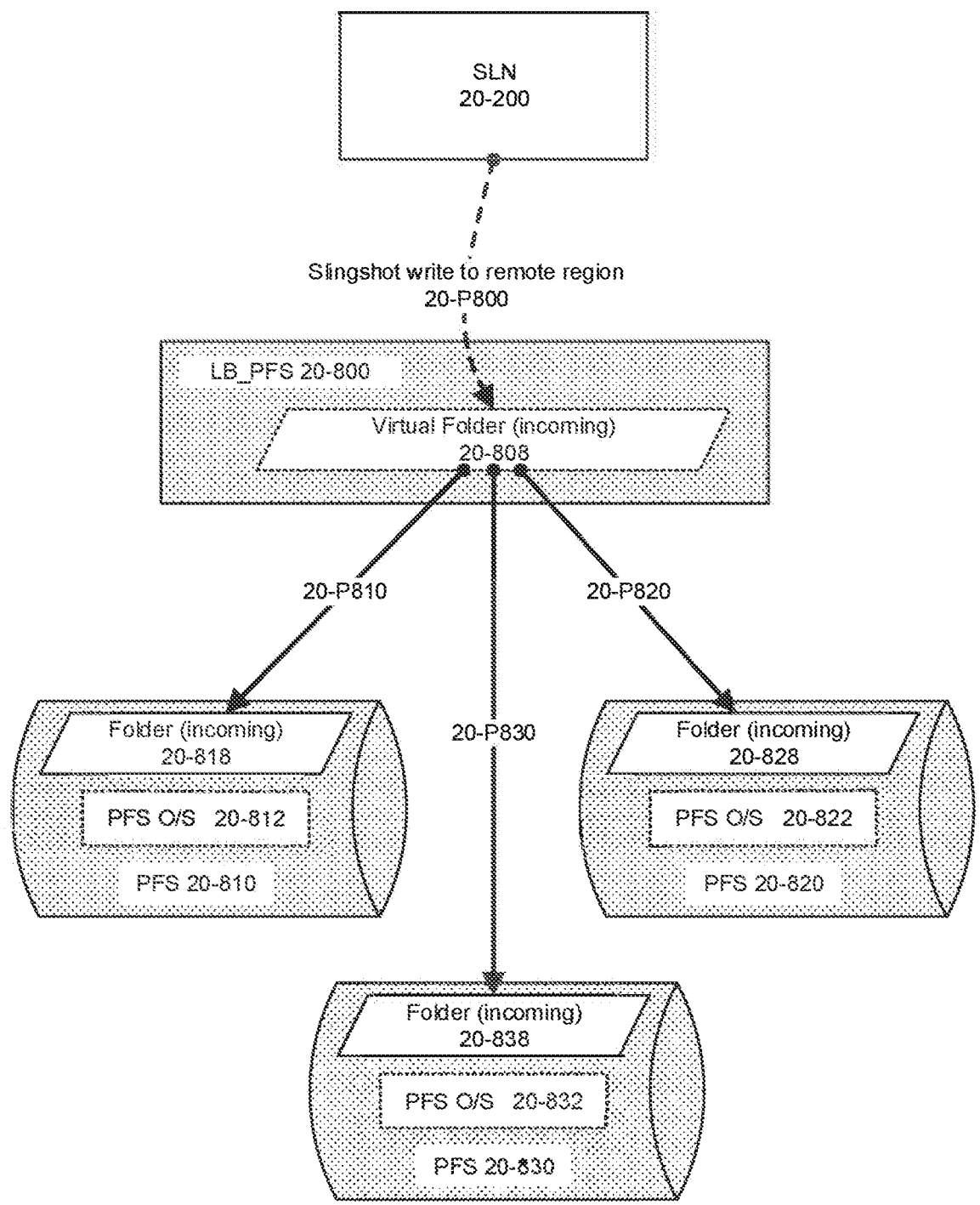
FIG. 20 illustrates virtualization abstraction of PFS folders for load balancing and failover.

FIG. 20 illustrates Virtualization Abstraction of PFS folders for load balancing and failover. This example embodiment demonstrates a sling node (SLN) writing to a virtualized abstraction layer to a PFS folder type 20-808 which could be written to one of many PFS devices such as 20-810, 20-820, or 20-830 illustrated herein. The LB_PFS 20-800 demonstrates how a PFS target may be load balanced.

PFS 20-810 can include PFS O/S 20-812 and Folder (incoming) 20-818. PFS 20-820 can include PFS O/S 20-822 and Folder (incoming) 20-828. PFS 20-830 can include PFS O/S 20-832 and Folder (incoming) 20-838. SLN 20-200 can slingshot write to a remote region (20-P800) such as virtual folder (incoming) 20-808. Paths or links between various elements of FIG. 20 include 20-P810, 20-P820, and 20-P830.

Figure 21:
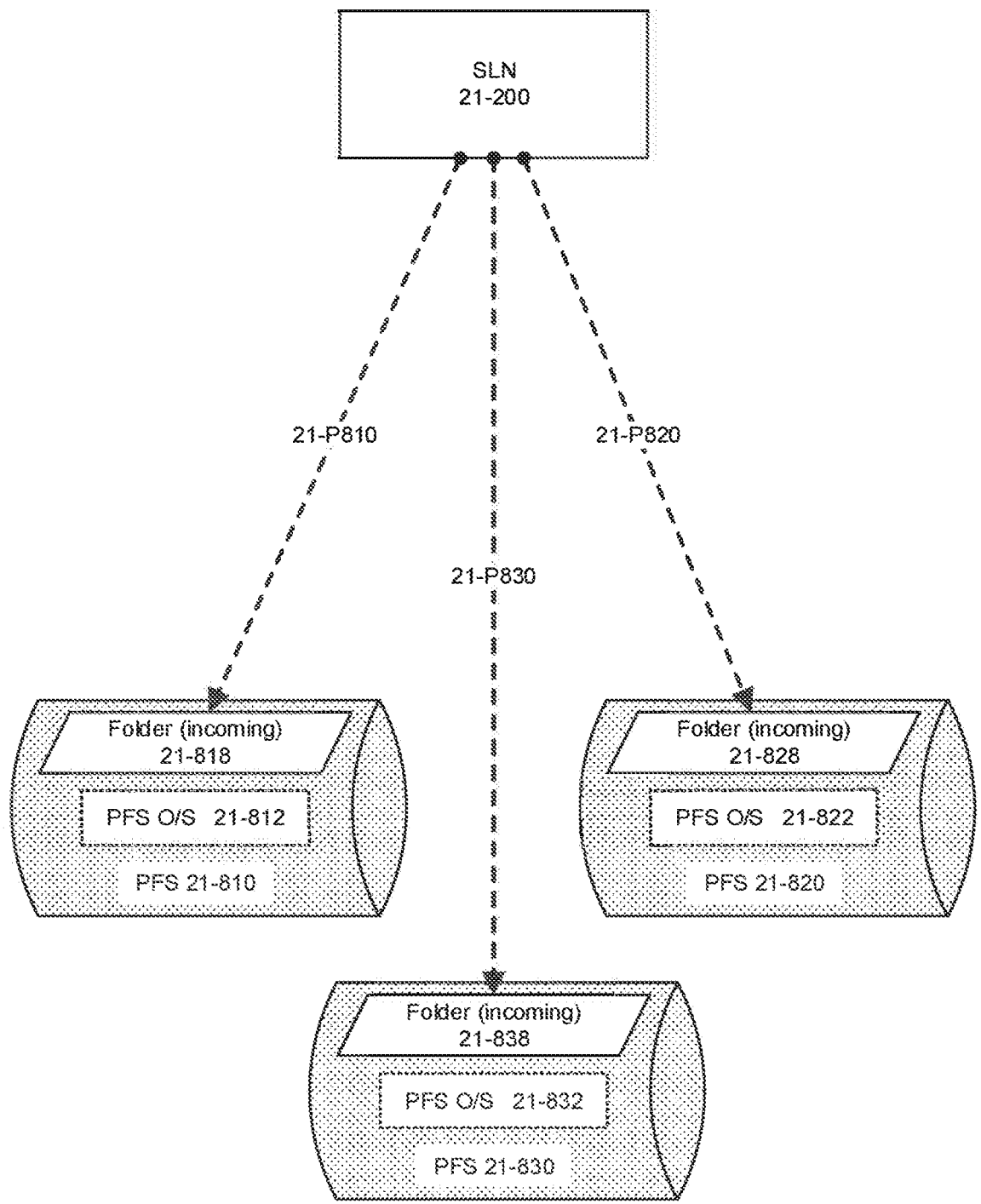
FIG. 21 illustrates transparent direct remote write to PFS folders.

FIG. 21 illustrates transparent direct remote write to PFS folders. This example embodiment demonstrates a sling node (SLN) 21-200 which has direct RDMA access to one of three parallel file system devices (PFS) 21-810, 21-820, or 21-830. It further demonstrates that the SLN 21-200 can write into a specific incoming folder 21-818, 21-828, and 21-838 respectively on each PFS device via 21-P810, 21-P820, and 21-P830. PFS 21-810, 21-820, 21-830 can include PFS O/S 21-812, 21-822, 21-832, respectively.

Figure 22:
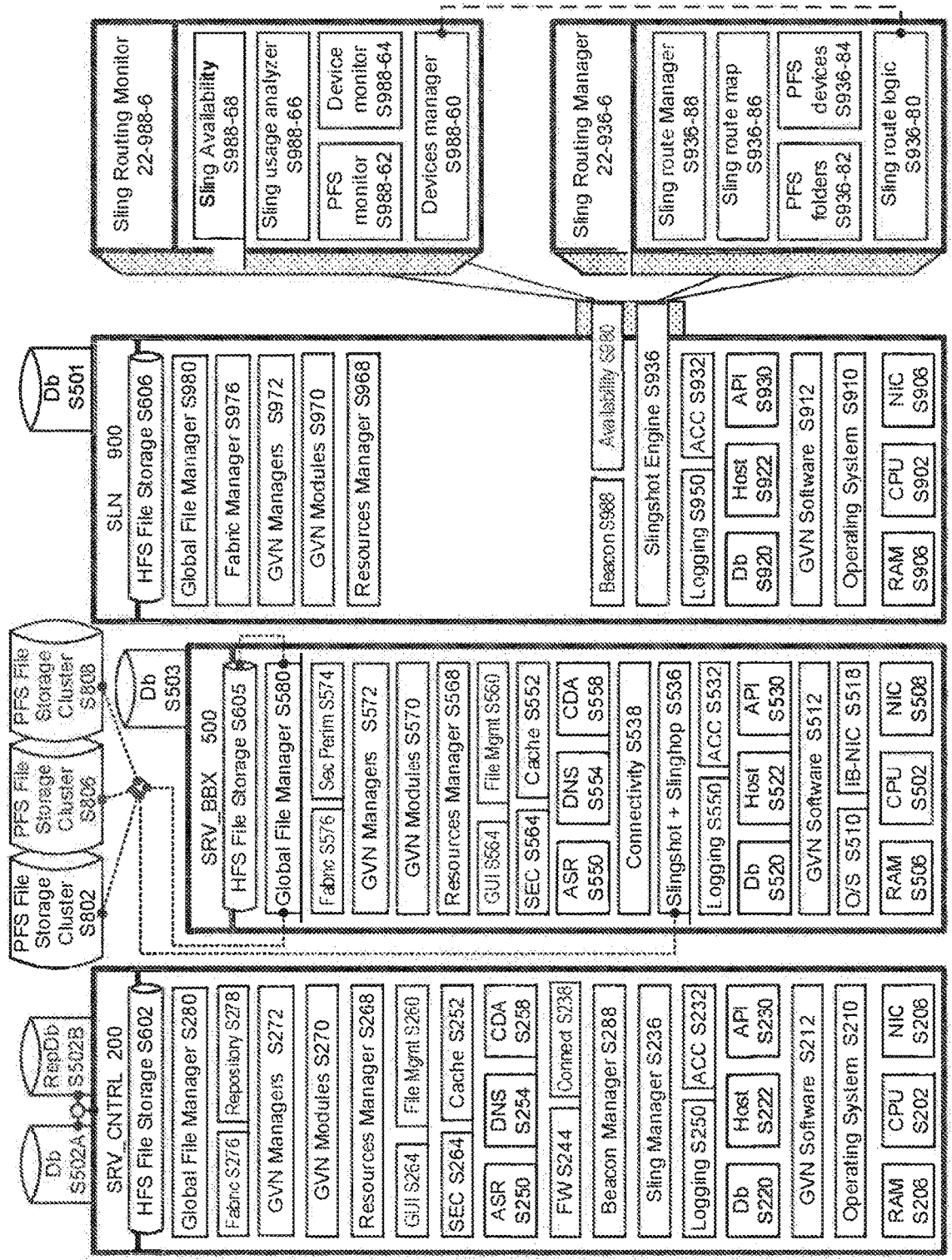
FIG. 22 illustrates a systems diagram of Slingroute and Sling with Managers and Modules and other logic.

FIG. 22 illustrates a systems Diagram with Slingroute and Sling with Managers and Modules and other logic. This example embodiment demonstrates the systems diagrams for some of the devices involved in sling routing such as a central control server (SRV_CNTRL) 200, a backbone exchange server (SRV_BBX) 500, a sling node (SLN) 900, plus Sling Routing Monitor 22-988-6, and Sling Routing Manager 22-936-6. FIG. 22 further demonstrates various modules and component parts which can facilitate slingshot, sling routing, Slinghop and other related functionality.

SRV_CNTRL 200 can include one or more of the following modules/components parts: HFS File Storage S602, Global File Manager S280, Fabric S276, Repository S278, GVN Managers S272, GVN Modules S270, Resources Manager S268, GUI S264, File Mgmt S260, SEC S264, Cache S252, ASR S250, DNS S254, CDA S258, FW S244, Connect S238, Beacon Manager S288, Sling Manager S236, Logging S250, ACC S232, Db S220, Host S222, API S230, GVN Software S212, Operating System S210, RAM S206, CPU S202, and NIC S208. SRV_CNTRL 200 can communicate with Db S502A and/or RepDb S502B.

SRV_BBX 500 can include one or more of the following modules/components parts: HFS File Storage S605, Global File Manager S580, Fabric S576, Sec Perim S574, GVN Managers S572, GVN Modules S570, Resources Manager S568, GUI S564, File Mgmt S560, SEC S564, Cache S552, ASR S550, DNS S554, CDA S558, Connectivity S538, Slingshot+Slinghop S536, Logging S550, ACC S532, Db S520, Host S522, API S530, GVN Software S512, O/S S510, IB-NIC S518, RAM S506, CPU S502, and NIC S508. SRV_BBX 500 can communicate with Db S503. PFS File Storage Clusters S802, S806, S808 can communicate with Global File Manager S580 and/or Slingshot+Slinghop S536.

SLN 900 can include one or more of the following modules/components parts: HFS File Storage S606, Global File Manager S980, Fabric Manager S976, GVN Managers S972, GVN Modules S970, Resources Manager S968, Beacon S988, Availability S980, Slingshot Engine S936, Logging S950, ACC S932, Db S920, Host S922, API S930, GVN Software S912, O/S S910, RAM S906, CPU S902, and NIC S908. SLN 900 can communicate with Db S501.

Sling Routing Monitor 22-988-6 can include one or more of the following modules/components parts: Sling Availability S988-68, Sling usage analyzer S988-66, PFS monitor S988-62, and Device monitor S988-64, Devices manager S988-609.

Sling Routing Manager 22-936-6 can include one or more of the following modules/components parts: Sling route Manager S936-88, Sling route map S936-86, PFS folders S936-82, PFS devices S936-84, and Sling route logic S936-80. Devices manager S988-60 can communicate with Sling route logic S936-80.

It is to be understood that the disclosed subject matter is not limited in its application to the details of construction and to the arrangements of the components set forth in the descriptions or illustrated in the drawings. The disclosed subject matter is capable of other embodiments and of being practiced and carried out in various ways. In addition, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems, methods and media for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A method, comprising:
   identifying, by one or more processors, a remote region in a network path to one or more network destinations associated with a first data transfer having a combined payload comprising a plurality of data packets, each packet in the plurality deliverable to or through at least one of the one or more network destinations;
   receiving, by the one or more processors, a list of available intermediate file systems from a first device, wherein the list of intermediate available file systems lists one or more file systems in the remote region from which data can be forwarded toward the one or more network destinations associated with the first data transfer;
   selecting, by the one or more processors, a first file system of the one or more file systems in the remote region based at least in part on the list of intermediate available file systems; and
   writing, by the one or more processors, data associated with the first data transfer, including the payload, to the first file system for separation into the plurality of data packets, each to be forwarded toward at least one of the one or more network destinations associated with the first data transfer.

2. The method of claim 1, wherein the first device is a control server and the first file system is a parallel file system.

3. The method of claim 1, wherein the list of intermediate available file systems includes a ranking of the intermediate available file systems based on one or more records associated with the one or more intermediate available file systems.

4. The method of claim 3, wherein the one or more records comprise at least one of state of device, storage levels, usage, problems and health issues reported to the first device in real-time.

5. The method of claim 4, wherein the state of device is predicted contextually based on current and historical performance associated with the one or more file systems.

6. The method of claim 1, further comprising:
receiving, by the one or more processors, a list of available folders from the first device, wherein the list of available folders indicates one or more folders associated with the first file system from which data can be forwarded toward the one or more network destinations associated with the first data transfer; and
selecting, by the one or more processors, a first folder of the one or more folders based at least in part on the list of available folders,
wherein writing the data associated with the first data transfer to the first file system comprises writing the data to the first folder.

7. The method of claim 6, wherein the first folder of the one or more folders is selected based on quality of service (QOS) associated with the first data transfer.

8. The method of claim 1, wherein the first data transfer comprises a carrier file.

9. The method of claim 8, wherein writing data associated with the first data transfer comprising writing the carrier file to the first file system via a Remote Direct Memory Access write operation.

10. A system comprising:
a non-transitory memory; and
one or more processors configured to read instructions from the non-transitory memory that, when executed, cause the one or more processors to perform operations comprising:
identifying a remote region in a network path to one or more network destinations associated with a first data transfer having a combined payload comprising a plurality of data packets, each packet in the plurality deliverable to or through at least one of the one or more network destinations;
receiving a list of available intermediate file systems from a first device, wherein the list of intermediate available file systems lists one or more file systems in the remote region from which data can be forwarded toward the one or more network destinations associated with the first data transfer;
selecting a first file system of the one or more file systems based at least in part on the list of intermediate available file systems; and
writing data associated with the first data transfer, including the payload, to the first file system for separation into the plurality of data packets, each to be forwarded toward at least one of the one or more network destinations associated with the first data transfer.

11. The system of claim 10, wherein the first device is a control server and the first file system is a parallel file system.

12. The system of claim 10, wherein the list of intermediate available file systems includes a ranking of the intermediate available file systems based on one or more records associated with the one or more intermediate available file systems.

13. The system of claim 12, wherein the one or more records comprise at least one of state of device, storage levels, usage, problems and health issues reported to the first device in real-time.

14. The system of claim 13, wherein the state of device is predicted contextually based on current and historical performance associated with the one or more file systems.

15. The system of claim 10, the operations further comprising:
receiving a list of available folders from the first device, wherein the list of available folders indicates one or more folders associated with the first file system from which data can be forwarded toward the one or more network destinations associated with the first data transfer; and
selecting a first folder of the one or more folders based at least in part on the list of available folders,
wherein writing the data associated with the first data transfer to the first file system comprises writing the data to the first folder.

16. The method of claim 15, wherein the first folder of the one or more folders is selected based on quality of service (QOS) associated with the first data transfer.

17. A non-transitory computer-readable medium storing instructions that, when executed by one or more processors, cause the one or more processors to perform operations comprising:
identifying a remote region in a network path to one or more network destinations associated with a first data transfer having a combined payload comprising a plurality of data packets, each packet in the plurality deliverable to or through at least one of the one or more network destinations;
receiving a list of available intermediate file systems from a first device, wherein the list of intermediate available file systems lists one or more file systems in the remote region from which data can be forwarded toward the one or more network destinations associated with the first data transfer;
selecting a first file system of the one or more file systems based at least in part on the list of intermediate available file systems; and
writing data associated with the first data transfer, including the payload, to the first file system for separation into the plurality of data packets, each to be forwarded toward at least one of the one or more network destinations associated with the first data transfer.

18. The non-transitory computer-readable medium of claim 17, wherein the list of intermediate available file systems includes a ranking of the intermediate available file systems based on one or more records associated with the one or more intermediate available file systems.

19. The non-transitory computer-readable medium of claim 18, wherein the one or more records comprise at least one of state of device, storage levels, usage, problems and health issues reported to the first device in real-time.

20. The non-transitory computer-readable medium of claim 17, the operations further comprising:
receiving a list of available folders from the first device, wherein the list of available folders indicates one or more folders associated with the first file system from which data can be forwarded toward the one or more network destinations associated with the first data transfer; and
selecting a first folder of the one or more folders based at least in part on the list of available folders,
wherein writing the data associated with the first data transfer to the first file system comprises writing the data to the first folder.

21. A method, comprising:
identifying, by one or more processors, a remote region in a path to one or more destinations associated with a first data transfer;

receiving, by the one or more processors, a list of available intermediate file systems from a first device, wherein the list of intermediate available file systems lists one or more file systems in the remote region from which data can be forwarded toward the one or more destinations associated with the first data transfer;

selecting, by the one or more processors, a first file system of the one or more file systems in the remote region based at least in part on the list of intermediate available file systems; and receiving, by the one or more processors, a list of available folders from the first device, wherein the list of available folders indicates one or more folders associated with the first file system from which data can be forwarded toward the one or more destinations associated with the first data transfer; and selecting, by the one or more processors, a first folder of the one or more folders based at least in part on the list of available folders and on a quality of service (QOS) associated with the first data transfer, and writing, by the one or more processors, data associated with the first data transfer to the first folder on the first file system for forwarding toward the one or more destinations associated with the first data transfer.

\* \* \* \* \*